(12) United States Patent
Ichihara

(10) Patent No.: US 9,043,705 B2
(45) Date of Patent: May 26, 2015

(54) SERVICE DISTRIBUTION DEVICE AND SERVICE DISPLAY DEVICE

(75) Inventor: Masaaki Ichihara, Gifu-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 13/390,433

(22) PCT Filed: Jan. 11, 2011

(86) PCT No.: PCT/JP2011/050281
§ 371 (c)(1),
(2), (4) Date: Feb. 14, 2012

(87) PCT Pub. No.: WO2012/095944
PCT Pub. Date: Jul. 19, 2012

(65) Prior Publication Data
US 2012/0272154 A1 Oct. 25, 2012

(51) Int. Cl.
G06F 3/01 (2006.01)
G06F 15/16 (2006.01)
G06F 9/44 (2006.01)

(52) U.S. Cl.
CPC .................................. G06F 9/4443 (2013.01)

(58) Field of Classification Search
CPC ......... G01C 21/36; G06F 3/042; G06F 15/16; G06F 11/32; G06F 11/328; G08G 1/00
USPC ....................................................... 715/738
See application file for complete search history.

(56) References Cited

U.S. PATENT DOCUMENTS

| | | | | |
|---|---|---|---|---|
| 5,872,569 A | * | 2/1999 | Salgado et al. | 715/764 |
| 6,112,015 A | * | 8/2000 | Planas et al. | 709/223 |
| 2005/0055154 A1 | * | 3/2005 | Tanaka et al. | 701/200 |
| 2005/0180426 A1 | * | 8/2005 | Sakata et al. | 370/395.2 |
| 2010/0146448 A1 | * | 6/2010 | Takahashi et al. | 715/835 |

FOREIGN PATENT DOCUMENTS

| | | |
|---|---|---|
| JP | 2001 159888 | 6/2001 |
| JP | 2003 150267 | 5/2003 |
| JP | 2005 028997 | 2/2005 |

(Continued)

OTHER PUBLICATIONS

Color differentiation, Jan. 13, 2005, pp. 1-3 http://www.lyftingsmo.no/labelling/labelling%20lines/colour%20differentiation.htm.*

(Continued)

*Primary Examiner* — Scott Baderman
*Assistant Examiner* — Mario M Velez-Lopez
(74) *Attorney, Agent, or Firm* — Oblon, McClelland, Maier & Neustadt, L.L.P.

(57) ABSTRACT

A service distribution device is provided that, when acquiring services to be used in an information terminal mounted in a vehicle or used in its passenger compartment, recognizes service availability beforehand, thereby improving usability of the services. A service distribution device includes an information correlation unit for correlating information that denotes service utilization conditions in relation to travel condition of the vehicle with the services. The service distribution device distributes to an information terminal the information that denotes the service utilization conditions correlated by the information correlation unit along with contents of the relevant service so that the information and the contents can be visibly displayed on a display unit in the information terminal.

29 Claims, 12 Drawing Sheets

(56) References Cited

FOREIGN PATENT DOCUMENTS

| JP | 2005 75314  | 3/2005 |
| JP | 2008 49873  | 3/2008 |
| JP | 2008 152417 | 7/2008 |
| JP | 2008 179314 | 8/2008 |

OTHER PUBLICATIONS

International Search Report Issued Feb. 8, 2011 in PCT/JP11/50281 Filed Jan. 11, 2011.
International Search Report Issued Feb. 8, 2011 in PCT/JP11/050281 Filed Jan. 11, 2011.

* cited by examiner

| Travel Restriction Imposed | Travel Restrictions Not Imposed | Some Travel Restrictions Imposed |
|---|---|---|
| E-Mail | Fuel Efficiency Display | Momentary Fuel Efficiency |
| Sekai Camera | Energy Flow | · |
| Foreign Exchange Guide | · | · |
| · | · | · |
| · | · | · |
| · | · | · |

| Service Type | Service Utilization Conditions |
|---|---|
| Service A | Vehicle Is Stopped |
| Service B | Speed Is 10 Km/H Or Less |
| Service C | Travel Restrictions Not Imposed |
| Service D | Travel Restrictions Not Imposed |
| Service E | Suburbs |
| Service F | Fine Weather |
| . | . |
| Service n | Vehicle Is Stopped |

SERVICE DISTRIBUTION DEVICE AND SERVICE DISPLAY DEVICE

TECHNICAL FIELD

The present invention relates to a service distribution device and a service display device and, specifically to a service distribution device and a service display device suitable for applications in the field of services utilized in a vehicle-mounted information terminal.

BACKGROUND ART

For example, a recent information terminal such as a cellular phone is capable of adding by downloading programs for implementing services, such as applications and contents that can be used in such an information terminal, from a dedicated server of a vendor via a network.

Further, recently, the services such as the applications and contents have come to be available also in an information terminal for vehicles mounted on a vehicle such as an automobile. To add a new function, such a vehicle-mounted information terminal would also download a program for implementing those services from the dedicated server of the vendor via the network.

At the same time, a proposal has been made to call attention to the handling of a vehicle by limiting automatically services available by the information terminal according to the travelling of the vehicle when the information terminal for use of such services is used in the vehicle interior while the vehicle is travelling. Such an information terminal (application performing device) is described in Patent Document 1.

As shown in FIG. 17 of the present application, the information terminal (application performing device) described in Patent Document 1 includes a vehicle-mounted application performing device 1, which is formed by, for example, a car navigation system. The application performing device 1 is configured to download an executable application program from a server 2 of a vendor. When downloading the application, a list screen of applications distributed from the server 2 appears on a display device (not shown) of the application performing device 1 so that a user may operate the application performing device 1 to select any desired one of those displayed applications. By such an operation for application selection, an application distribution request is made to the server 2 from an application addition unit 11 of the application performing device 1 having a function to wirelessly communicate with the server 2, so that an application that responds to this request is distributed from the server 2. The distributed application is acquired by the application addition unit 11 and added into an application storage unit 12 of the application performing device 1.

The application performing device 1 further includes, in an application management unit 15 for managing operations of an application, an operation control unit 14 for controlling the operations of the application program based on a result of detection by a vehicle condition detection unit 13, which detects travelling of the vehicle. The operation control unit 14 provides an application performing unit 16 with permission to actuate an application program, which may affect handling of the vehicle because complicated handling of the application program is required, only when it is determined that the vehicle is not travelling. As a result, when the vehicle mounted with the application execution device 1 is travelling, use of an application that may affect the handling of the vehicle is restricted so that the driver will concentrate on handling the vehicle.

PRIOR ART DOCUMENT

Patent Document

Patent Document 1: Japanese Laid-Open Patent Publication No. 2005-28997

SUMMARY OF THE INVENTION

Problems that the Invention is to Solve

Generally, however, a user such as a driver or a passenger of a vehicle can only recognize whether use of such an application is restricted while the vehicle is travelling when he or she is about to use the application. Accordingly, the driver of the travelling vehicle, even if he or she has acquired, that is, downloaded the application program into his information terminal via a network or the like in order to use the application program, cannot use the application program if its use during the travelling is restricted. That is, in such a case, the user has downloaded an application program that cannot be used and performed the operations in vain, thereby making the use of services from a vehicle such as applications and contents in the vehicle inconvenient.

In view of the above, the present invention has been developed, and the object of the present invention is to provide a service distribution device and a service display device that can improve the service convenience by making it possible to recognize the availability of a service in advance before it is acquired to be used in an information terminal mounted or used in a vehicle.

Means for Solving the Problems

To achieve the foregoing objective, a service distribution device according to the present invention distributes services to be used in an information terminal to the information terminal. The information terminal is mounted in a vehicle or used in the passenger compartment of a vehicle. The device includes a service distribution unit for distributing information that denotes service utilization conditions or a service utilization environment in relation to a travel condition of the vehicle, along with the contents of the relevant service, to the information terminal so that the information and the contents can be visibly displayed on the information terminal.

In this configuration, a service distributed to the information terminal from the service distribution unit is correlated with information that denotes conditions and environments for using the service in relation to the travel condition of the vehicle. The information that denotes the contents of such service utilization condition and a service utilization environment is distributed to the relevant information terminal from the service distribution unit so that this information can be visibly displayed on the information terminal along with the relevant service contents. Therefore, the information terminal visibly displays information that denotes the utilization conditions and utilization environment in the information terminal along with the relevant service contents. This enables the user of the information terminal to recognize the availability of a service in advance based on the information that denotes the relevant utilization conditions and utilization environment before the user acquires this service to be used in this information terminal. As a result, the user can selectively acquire a service having availability in the information terminal from the service distribution unit and, therefore, is inhibited from unnecessarily acquiring the services from the service distribution unit that cannot be used in the information terminal or are not suited for use in the current environment. Accordingly, it is possible for the information terminal to acquire a service that matches its availability from the service distribution device, thereby improving convenience.

In accordance with one aspect of the present invention, the information denoting the service utilization conditions in relation to the vehicle travel condition denotes whether the service can be used in accordance with the vehicle travel condition. The information denoting the service utilization environment in relation to the vehicle travel condition is information denoting at least one of the utilization environment at the time when the vehicle is travelling as the service utilization environment that is expected in correspondence to a purpose of the service, the utilization environment at the time when the vehicle is stopped, and the utilization environment common to the time when the vehicle is travelling and the time when the vehicle is stopped.

For example, when the vehicle is travelling, it is desirable to restrict the use of services that may affect handling of the vehicle, so that those services have low availability in such condition. It is less necessary to restrict services that may not affect the handling of the vehicle even when the vehicle is travelling, so that those services have high availability even in such condition. Accordingly, a service distribution device having the above configuration provides the information terminal with information that denotes whether a service can be used for travelling vehicles as the information denoting the service utilization conditions along with contents of this service, thereby enabling the user of the service to recognize beforehand a service-specific utilization mode depending on whether to use the service in a travelling vehicle. As a result, it is possible to visibly display the acquirable service along with whether it can be used on the information terminal, thereby permitting the user to recognize in advance whether this service can be used prior to acquiring it.

Further, the services on which such utilization restrictions are not set may include a service useful when it is used irrespective of the travelling of the vehicle, a service useful if it is used only when the vehicle is travelling, and a service useful if it is used only when the vehicle is stopped. Therefore, the service distribution device having the above configuration provides the information terminal with information that denotes vehicle travel, that is, a service utilization environment, which matches a service purpose as the information that denotes the service utilization environment along with contents of this service. As a result, the information terminal can permit the user of a service to recognize beforehand a utilization mode peculiar to the service which mode varies according to whether the vehicle is travelling. This enables the information terminal to visibly display a service that can be acquired by the information terminal as well as condition of the vehicle that matches its purpose, thereby permitting the user to recognize the vehicle condition that matches the purpose of the service prior to acquisition of the service.

In accordance with one aspect of the present invention, the service distribution device further includes an information correlation unit for correlating, with the service, the information that denotes the service utilization conditions or the service utilization environment in relation to the travel condition of the vehicle.

In this configuration, the information correlation unit automatically provides the service with information that denotes service utilization conditions or a service utilization environment in relation to each vehicle travelling. As a result, the utilization conditions or utilization environment for a service that can be distributed by the service distribution device need not be set or grasped by the relevant manager or the like, so that the service distribution device can more easily realize distribution of information that enables the user to recognize availability of the service.

In accordance with one aspect of the present invention, the service distribution device further includes a database in which a plurality of types of services are registered beforehand. The information correlation unit is configured to correlate the information that denotes the service utilization conditions or the service utilization environment in relation to the travel condition of the vehicle for each of the services registered in the database. The service distribution unit extracts the service of which distribution is requested by the information terminal as well as the information denoting the utilization conditions or the utilization environment correlated with the service from the database and distributes contents of the extracted service and the information denoting the utilization conditions or the utilization environment to the information terminal so that the contents and the information can be displayed visibly on the terminal.

The present invention is particularly suited for applications in a case where the service distribution device distributes a plurality of types of services. That is, in this configuration, even if there are services that can be acquired from the service distribution device via the information terminal, the service user can acquire an arbitrary one of the services taking into account the utilization conditions and utilization environments of the services.

In accordance with one aspect of the present invention, the service is a vehicle-use content or a vehicle-use application. The information terminal is a vehicle-use information terminal, which can use for operation the vehicle-use content or the vehicle-use application.

The vehicle-use contents or the vehicle-use applications include those of which use is permitted when the vehicle is travelling and those of which use is prohibited when the vehicle is travelling. Further, the vehicle-use contents or applications include, for example, those that are suited for use when the vehicle is travelling, those that are suited for use when it is stopped, and further, those that are suited for full-time use both when it is travelling and when it is stopped. Therefore, in the above configuration, also in a case where the vehicle-mounted information terminal acquires a vehicle-use content or a vehicle-use application that is performed in it, the user can recognize the availability of the content or application before it is acquired by the information terminal.

In accordance with one aspect of the present invention, the service distribution device further includes an image information generation unit for generating image information, which can be visibly displayed on the information terminal. When the services are a plurality of types of services, the image information generation unit generates contents of the plurality of types of services as image information in a display format capable of displaying the contents of the plurality of types of services simultaneously and generates contents of the services having the different utilization conditions or utilization environments as the image information in the respective display formats.

The present invention is particularly effective for applications in a case where plural types of services are distributed from the above service distribution unit. That is, in this configuration, even if utilization conditions or utilization environments of the types of services that are displayed on the information terminal simultaneously are different from each other, the service distribution device can distribute image information that denote contents of those services as information in a display format that matches the utilization conditions or utilization environments of the respective services. Therefore, also if the information terminal simultaneously displays a plurality of types of services of which utilization conditions and utilization environments are different from each other, the user can identify which one of the services has higher or lower availability for a travelling vehicle. As a result, even if there are a plurality of types of services that can be acquired via the information terminal, the service user can acquire an arbitrary one of the services from the service distribution device taking into account their utilization conditions and utilization environments.

In accordance with one aspect of the present invention, in the respective display formats for the contents of the services having the different utilization conditions or utilization environments, the contents of those services are displayed by subdividing the contents into groups corresponding to different utilization conditions or different utilization environments.

In this configuration, the image information generation unit generates the image information in a display format that enables classifying the contents of services of which utilization conditions or utilization environments are different from each other into groups for each of those utilization conditions or utilization environments. Therefore, the information terminal, which displays such image information can list, for example, a group of the services that can be used in a travelling vehicle and a group of the services that cannot be used in a travelling vehicle separately from each other. Further, the information terminal, which displays such image information, can list, for example, the group of the services of which use is suited for travelling vehicles and the group of the services of which use is not suited for travelling vehicles separately from each other. That is, the user can easily grasp the utilization conditions and utilization environments of a plurality of services to be displayed on the information terminal by referencing the displayed list of those services for each of the utilization conditions and utilization environments.

In accordance with one aspect of the present invention, in the respective display formats for the contents of the services having the different utilization conditions or utilization environments, the contents of those services are displayed in respectively different colors.

In this configuration, the image information generation unit generates the image information in a display format that enables services having the different utilization conditions and utilization environments to be colored differently from each other. Therefore, the information terminal, which displays such image information, can simultaneously display services that can be used and services that cannot be used for the vehicle travel condition, in different colors, respectively. Further, the information terminal that displays such image information can simultaneously display services of which use is suited for the vehicle travel condition and services of which use is not suitable for vehicle travel in different colors. As a result, the user can identify the utilization conditions and utilization environments of a plurality of services displayed simultaneously by using the user's color vision.

In accordance with one aspect of the present invention, the image information generation unit is capable of generating the image information denoting services of which use is temporarily restricted from among the contents in blinking representation.

The services include those of which use is permitted irrespective of the travel condition of the vehicle and those of which use is uniformly restricted when the vehicle is travelling. Further, for example, there is a special service of which use is temporarily restricted when the vehicle is in specific travel condition in such a case that it may be travelling at least at a given constant speed. In accordance with this configuration, the information terminal can provide identification display so that the utilization conditions of the special service of which use is restricted temporarily may be identified more easily based on the image information generated by the image information generation unit. This expands the modes in which the information terminal displays the information that denotes the service utilization conditions that vary with the vehicle travel conditions.

In accordance with one aspect of the present invention, the respective display formats for the contents of the services having the different utilization conditions or utilization environments are capable of displaying the contents in constantly lit representation or blinking representation.

In this configuration, the image information generation unit generates the image information in a display format that enables displaying the contents of the services having the different utilization conditions and utilization environments in either constantly lit presentation or blinking presentation that is selected in accordance with those utilization conditions and utilization environments. Therefore, the information terminal, which displays such image information displays, for example, the service that can be used for the vehicle travel condition and the service that cannot be used for the vehicle travel conditions in such a manner that the user can distinguish between them based on whether they are blinking in display, for example. Further, the information terminal, which displays such image information displays, for example, the service of which use is suited for the vehicle travel condition and the service of which use is not suited in such a manner that the user can distinguish between them based on whether they are blinking in display, for example. As a result, the user can distinguish the utilization conditions and utilization environments of a plurality of services that are displayed simultaneously, based on whether they are blinking in display, for example.

In accordance with one aspect of the present invention, the information denoting the utilization conditions of the services in relation to the travel condition of the vehicle includes travel conditions of the vehicle for using the services. The image information unit is further capable of visibly displaying the travel conditions of the vehicle for using the services.

In this configuration, the image information generation unit generates image information capable of visibly displaying vehicle travel conditions for service use. Therefore, the information terminal, which displays such image information, for example, displays the vehicle travel conditions for the use of each service along with contents of the service. For this reason, for example, the information terminal displays the contents and the name of a service of which use is permitted only when the vehicle is stopped along with a display utilization conditions: stopped or the like, as travel conditions for the use of this service. The display of utilization conditions: stopped means that the service can be used on condition that the vehicle is stopped. Further, for example, the information terminal displays the contents and the name of a service of which use is permitted only when the vehicle is travelling at a speed of 10 km/h or less along with a display utilization conditions: travelling speed of 10 km/h, or the like as travel conditions for the use of this service. This enables the user of the service to recognize beforehand the travel conditions for use of a service to be acquired from the service distribution device.

To achieve the foregoing objective, a service display device according to the present invention is capable of displaying contents of services to be used in an information terminal, which is mounted in a vehicle or used in the passenger compartment of a vehicle. The device includes a display unit for displaying, based on information denoting contents and utilization conditions or a utilization environment of the services distributed from the service distribution device described above, the information denoting the utilization conditions or the utilization environment of the relevant service along with the contents of this service.

In this configuration, the display unit of the service display device displays information that denotes contents of a service distributed from the service distribution device based on information denoting the contents as well as utilization conditions and utilization environments of the service. That is, the display unit visibly displays the information that denotes the utilization conditions and utilization environments in the information terminal along with the contents of the relevant service. As a result, before acquiring a service to be used in the information terminal, the user of this information terminal can recognize availability of the service in advance based on the information that denotes the utilization conditions and utilization environments of the service. The information can thus selectively acquire the services having availability in the information terminal. That is, the information terminal is inhibited from unnecessarily acquiring services of which use is not suited in the current environment. This enables the information terminal to acquire a service that matches the availability from the service distribution device, eventually improving the service convenience.

In accordance with one aspect of the present invention, the display unit is configured to simultaneously display a plurality of types of the services. When displaying the contents of those services simultaneously, the display unit displays the contents of the services having the different utilization conditions or utilization environments in respective display modes.

The present invention is particularly effective for applications in a case where contents of a plurality of types of services are displayed simultaneously. That is, in this configuration, even if utilization conditions or utilization environments of the plurality of types of services that are displayed simultaneously are different from each other, the display unit displays contents of those services in a display format according to their utilization conditions or utilization environments. Therefore, also in a case where the display unit simultaneously displays a plurality of types of services having the different utilization conditions, the user can identify which one of the services has higher or lower availability for the travel condition of the vehicle. Further, also in a case where the display unit simultaneously displays a plurality of types of services having the different utilization environments, the user can identify which one of the services is suited or not suited for the vehicle travel condition. As a result, even if there are a plurality of types of services that can be acquired via the information terminal, the service user can acquire an arbitrary one of the services from the service distribution device taking into account their utilization conditions and utilization environments.

In accordance with one aspect of the present invention, in a display in the respective display modes by the display unit for the contents of the services having the different utilization conditions or utilization environments, the different utilization conditions or utilization environments are subdivided into respectively different groups and displayed.

In this configuration, the display unit provides group-specific display of the contents of services having the different utilization conditions or utilization environments for each of those utilization conditions or utilization environments. Therefore, the display unit can, for example, display a list of services in condition where they are subdivided into a group of those that can be used for the vehicle travel condition and a group of those that cannot be used for the vehicle travel condition. Further, the display unit can, for example, display a list of services in condition where they are subdivided into a group of those of which use is suited for the vehicle travel condition and a group of those of which use is not suitable for the vehicle travel condition. That is, the user can easily grasp the utilization conditions and utilization environments of a plurality of services to be displayed on the information terminal by referencing the list of those services displayed by the display unit for each of the utilization conditions and utilization environments.

In accordance with one aspect of the present invention, in a display in the respective display modes by the display unit for the contents of the services having the different utilization conditions or utilization environments, the contents of those services are displayed in respectively different colors.

In this configuration, the display unit displays the contents of services having the different utilization conditions or utilization environments in correspondingly different colors for utilization conditions or utilization environments. Therefore, the display unit can simultaneously display the service that can be used for the vehicle travel condition and the service that cannot be used for the vehicle travel condition, in different colors. Further, for example, the display unit can simultaneously display services of which use is suited for the vehicle travel condition and services of which use is not suitable for the vehicle travel condition in different colors. As a result, the user can identify the utilization conditions and utilization environments of a plurality of services displayed simultaneously by the display unit, by using the user's color vision.

In accordance with one aspect of the present invention, the services include a service of which use is temporarily restricted when the vehicle is in specific condition. The display unit displays the contents of the services of which use is temporarily restricted in blinking representation.

The services include those of which use is permitted irrespective of the travel condition of the vehicle and those of which use is uniformly restricted when the vehicle is travelling. Further, for example, there is a service of which use is temporarily restricted when the vehicle is in specific travel condition, for example, when the vehicle is travelling at a given constant speed or greater. As described in the above configuration, the display unit blinks in display the contents of a service of which use is temporarily restricted so that, for example, the user can further display an identification display the utilization conditions of such a special service. This expands the modes in which the display unit displays the information that denotes the service utilization conditions that vary with the vehicle travel conditions.

In accordance with one aspect of the present invention, the display in the respective display modes by the display unit for the contents of the services having the different utilization conditions or utilization environments is a determination display, in which constant lit representation or blinking representation is selected and employed.

In this configuration, the display unit displays the contents of the services having the different utilization conditions or utilization environments in such a manner that they can be distinguished from each other based on whether they are constantly lit or blinking in display. Therefore, for example, the user can distinguish between the services that can be used for the vehicle travel condition and the services that cannot be used for the vehicle travel condition, based on whether they are blinking on the display unit, for example. Further, the user can distinguish between the services of which use is both suitable for and unsuitable for the vehicle travel condition, based on whether they are blinking on the display unit, for example. As a result, the user can identify the utilization conditions and utilization environments of a plurality of services that are displayed simultaneously, based on whether they are blinking on the display unit, for example.

In accordance with one aspect of the present invention, the information denoting the services utilization conditions in relation to the travel condition of the vehicle includes travel conditions of the vehicle for using the services. The display unit also displays the travel conditions of the vehicle for using the services.

In this configuration, the display unit displays the vehicle travel conditions for use of each service along with contents of this service. For this reason, for example, the display unit displays the contents and the name of a service of which use is permitted only when the vehicle is stopped along a display utilization conditions: stopped or the like as travel conditions for the use of this service. Further, for example, the display unit displays the contents and the name of a service of which use is permitted only when the vehicle is travelling at a speed of 10 km/h or less along with a display utilization conditions: travelling speed of 10 km/h or the like as travel conditions for the utilization of this service. This enables the user of the service to recognize beforehand the travel conditions for utilization of a service to be acquired from the service distribution device.

In accordance with one aspect of the present invention, the display unit is mounted in the information terminal, which is mounted in the vehicle.

In this configuration, the display unit is mounted in the vehicle-mounted information terminal. That is, the information terminal that uses services is configured integrally with the display unit, which displays information denoting the utilization conditions and utilization environments of the services used in this information terminal. This enables the information terminal, for example, to have both of a screen on which is used for services such as vehicle-use contents or vehicle-use applications used by a vehicle-mounted information terminal and a screen on which is for display of their utilization conditions and utilization environments.

To achieve the foregoing objective, a service display device according to the present invention is capable of displaying contents of services to be used in an information terminal, which is mounted in a vehicle or used in the passenger compartment of a vehicle. The device includes a determination unit and a display unit. The determination unit determines service utilization conditions or service utilization environments in relation to travel condition of the vehicle. The display unit displays information denoting the utilization conditions or the utilization environment determined by the determination unit along with the contents of the relevant service.

In this configuration, the identification unit in the service display device identifies the utilization conditions and utilization environments of services that are used in the information terminal. Then, the display unit displays information that denotes the identified utilization conditions and utilization environment along with contents of the relevant service. That is, the identification unit mounted in the service display device identifies the utilization conditions and utilization environments of a service that is provided via the information terminal, so that the display unit visibly displays the information that denotes the utilization conditions and utilization environment at the information terminal along with contents of the relevant service. Therefore, when acquiring a service to be used in the information terminal, the user of this information terminal can recognize availability of this service beforehand based on the information denoting the utilization conditions and utilization environment of this service. As a result, the user can selectively acquire services having availability by using the information terminal. That is, the user is inhibited from unnecessarily acquiring services that cannot be used or those of which use is not suited under the current environment through the information terminal. This enables the user to acquire services that match the availability, eventually improving the availability of the services.

In accordance with one aspect of the present invention, the service display device further includes a table in which the service utilization conditions or the service utilization environment for the travel condition of the vehicle are registered. The determination unit determines the utilization conditions or the utilization environments by referencing the table.

In this configuration, the table registers service utilization conditions or utilization environments for the vehicle travel condition. When identifying the service utilization conditions or utilization environments, the identification unit references the table to thereby identify the utilization conditions or utilization environment for each of the service. In such a manner, the identification unit can identify the service utilization conditions or utilization environments through simple processing of cross-checking the utilization conditions or utilization environment registered in the table.

In accordance with one aspect of the present invention, the information denoting the service utilization conditions for the travel condition of the vehicle denotes whether the services can be used in relation to the travel condition of the vehicle. The information denoting the service utilization environment in relation to the travel condition of the vehicle is information denoting at least one of the utilization environment at the time when the vehicle is travelling as the utilization environment of the service that is expected in correspondence to a purpose of the service, the utilization environment at the time when the vehicle is stopped, and the utilization environments common to the time when the vehicle is travelling and the time when the vehicle is stopped.

For example, when the vehicle is travelling, it is desirable to restrict the use of a service that may affect handling of the vehicle, so that the availability of such a service is low when the vehicle is travelling. Even when the vehicle is travelling, it is less necessary to restrict the use of a service that may not possibly affect handling of the vehicle, so that the availability of such a service is high even when the vehicle is travelling. Therefore, as in this configuration, by providing information that denotes whether a service can be used for the vehicle travel condition as the information denoting the service utilization conditions along with contents of this service, the display unit can permit the user to recognize beforehand the service utilization mode in which whether the service can be used depends on the vehicle travel condition. It is thus possible for the display unit to visibly display the service that can be acquired at the information terminal along with whether the service can be used, thereby permitting the user to recognize in advance whether the service can be used prior to acquisition of the service from the service distribution device.

Further, even the services on which such utilization restrictions are not imposed include a service useful when it is used by the user irrespective of the travel condition of the vehicle, a service useful if it is used by the user only when the vehicle is travelling, and a service useful if it is used by the user only when the vehicle is stopped. Therefore, as in the above configuration, the service distribution device provides the information terminal with information that denotes vehicle travel condition, that is, a service utilization environment, that matches a service purpose as the information that denotes the service utilization environment along with contents of this service. As a result, the service display device can permit the user of a service to recognize beforehand a utilization mode of the service in which mode varies with the vehicle travel condition. Accordingly, the display unit enables the information terminal to visibly display a service that can be acquired by the information terminal as well as condition of the vehicle that matches its purpose. Accordingly, the service display device can permit the user to recognize beforehand the vehicle condition that matches the purpose of the service prior to acquisition of the service by the information terminal from the service distribution device.

In accordance with one aspect of the present invention, the display unit is configured to simultaneously display a plurality of types of the services. When displaying the contents of those services simultaneously, the display unit displays the contents of the services having the different utilization conditions or utilization environments determined by the determination unit in respective display modes.

As described above, the present invention is particularly suited for applications in a case where the service distribution device displays contents of a plurality of types of services simultaneously. That is, in this configuration, even if the plurality of types of services to be displayed simultaneously have the different utilization conditions or utilization environments, the service display device displays contents of those services in a display form that matches those utilization conditions or utilization environments. Therefore, even in a case where the service display device simultaneously displays the plurality of types of services having the different utilization conditions, the service user can identify which one of the services has higher or lower availability for the travel condition of the vehicle. Further, even in a case where the service display device simultaneously displays the plurality of types of services having the different utilization environments, the service user can identify which one of the services is suited for use for the travelling condition of the vehicle or not suited. As a result, even if there are a plurality of services that can be acquired via the information terminal, the user can acquire an arbitrary one of the services from the service distribution device taking into account their utilization conditions or utilization environments.

In accordance with one aspect of the present invention, in the display in the respective display modes by the display unit for the contents of the services having the different utilization conditions or utilization environments, the different utilization conditions or utilization environments are subdivided into respectively different groups and displayed.

In this configuration, the service display device provides group-specific display of the contents of services having the different utilization conditions or utilization environments for each of those utilization conditions or utilization environments. Therefore, the service display device can, for example, display a list of services in condition where they are subdivided into a group of those that can be used for the vehicle travel condition and a group of those that cannot be used for the travel condition. Further, the service display device can, for example, display a list of services in condition where they are subdivided into a group of those of which use is suited for the vehicle travel condition and a group of those of which use is not so suited. That is, the user can easily grasp the utilization conditions and utilization environments of services by referencing the list of the services displayed by the service display device for each of the utilization conditions and utilization environments.

In accordance with one aspect of the present invention, in the display in the respective display modes by the display unit for the contents of the services having the different utilization conditions or utilization environments, the contents of those services are displayed in respectively different colors.

In this configuration, the service display device displays the contents of services having the different utilization conditions or utilization environments in correspondingly different colors for utilization conditions or utilization environments. Therefore, the service display device can simultaneously display services that can be used for the vehicle travel condition and the service that cannot be so used in different colors. Further, for example, the service display device can simultaneously display services of which use is suited for the vehicle travel condition and services of which use is not so suited in different colors. As a result, the user can identify the utilization conditions and utilization environments of a plurality of services displayed simultaneously, by using the user's color vision.

In accordance with one aspect of the present invention, the determination unit further has a function to determine the service of which use is temporarily restricted when the vehicle is in specific condition from the information denoting the service utilization conditions in relation to the travel condition of the vehicle. The display unit displays the contents of the service of which use is temporarily restricted in blinking representation.

The services include, for example, those of which use is permitted irrespective of the travel condition of the vehicle and those of which use is uniformly restricted when the vehicle is travelling. Further, for example, there is a service of which use is temporarily restricted when the vehicle is in a specific travel condition, for example, when the vehicle is travelling at a given constant speed or greater. As described in the above configuration, the service display device blinks in displaying the contents of a service of which use is temporarily restricted so that, for example, the utilization conditions of such a special service can be identified more easily. This expands the modes in which the service display device displays the information that denotes the service utilization conditions that vary with the vehicle travel conditions.

In accordance with one aspect of the present invention, the display in the respective display modes by the display unit for the contents of the services having the different utilization conditions or utilization environments is a determination display in which constantly lit representation or blinking representation is selected and implemented.

In this configuration, the service display device displays the contents of the services having different utilization conditions or utilization environments in such a manner that they can be distinguished from each other based on whether they are being displayed in a constantly lit or blinking manner. Therefore, for example, the user can distinguish between services that can be used for the vehicle travel condition and the services that cannot be so used based on whether they are blinking on the service display device, for example. Further, the user can distinguish between services of which use is suited for the vehicle travel condition and the services of which use is not so suited based on whether they are blinking on the service display device, for example. As a result, the user can identify the utilization conditions and utilization environments of a plurality of services that are displayed simultaneously, based on whether they are blinking on the service display device, for example.

In accordance with one aspect of the present invention, the determination unit is configured to also determine travel conditions of the vehicle for using the service as the information denoting the service utilization conditions in relation to the travel condition of the vehicle. The display unit also displays the vehicle travel conditions determined by the determination unit for using the services.

In this configuration, the display unit displays the vehicle travel conditions for use of each service along with contents of each service. For this reason, for example, the service display device displays the contents and the name of a service of which use is permitted only when the vehicle is stopped along with utilization conditions: stopped or the like as travel conditions for the use of this service. Further, for example, the service display device displays the contents and the name of a service of which use is permitted only when the vehicle is travelling at a speed of 10 km/h or less along with utilization conditions: travelling speed of 10 km/h or the like as travel conditions for the use of this service. This enables the user of the service to recognize beforehand the travel conditions for use of a service to be acquired from the service distribution device.

In accordance with one aspect of the present invention, the display unit is mounted in the information terminal mounted in the vehicle.

In this configuration, the display unit is mounted in the vehicle-mounted information terminal. That is, the information terminal that uses services is configured integrally with the display unit, which displays information denoting the utilization conditions and utilization environments of the services used in this information terminal. This enables the information terminal, for example, to have both of a screen to be used for services such as vehicle-use contents or vehicle-use applications used by a vehicle-mounted information terminal and a screen for display of their utilization conditions or utilization environments.

BRIEF DESCRIPTION OF THE DRAWINGS

FIG. 12($b$) is a diagram showing an example of vehicle travel conditions for use of services displayed on the display unit of the service distribution device and the service display unit according to the embodiment of FIG. 12($a$);

DETAILED DESCRIPTION OF THE PREFERRED EMBODIMENTS (First Embodiment)

The following will describe a service distribution device and a service display device according to a first embodiment of the present invention with reference to FIGS. 1 to 8.

Figure 1:
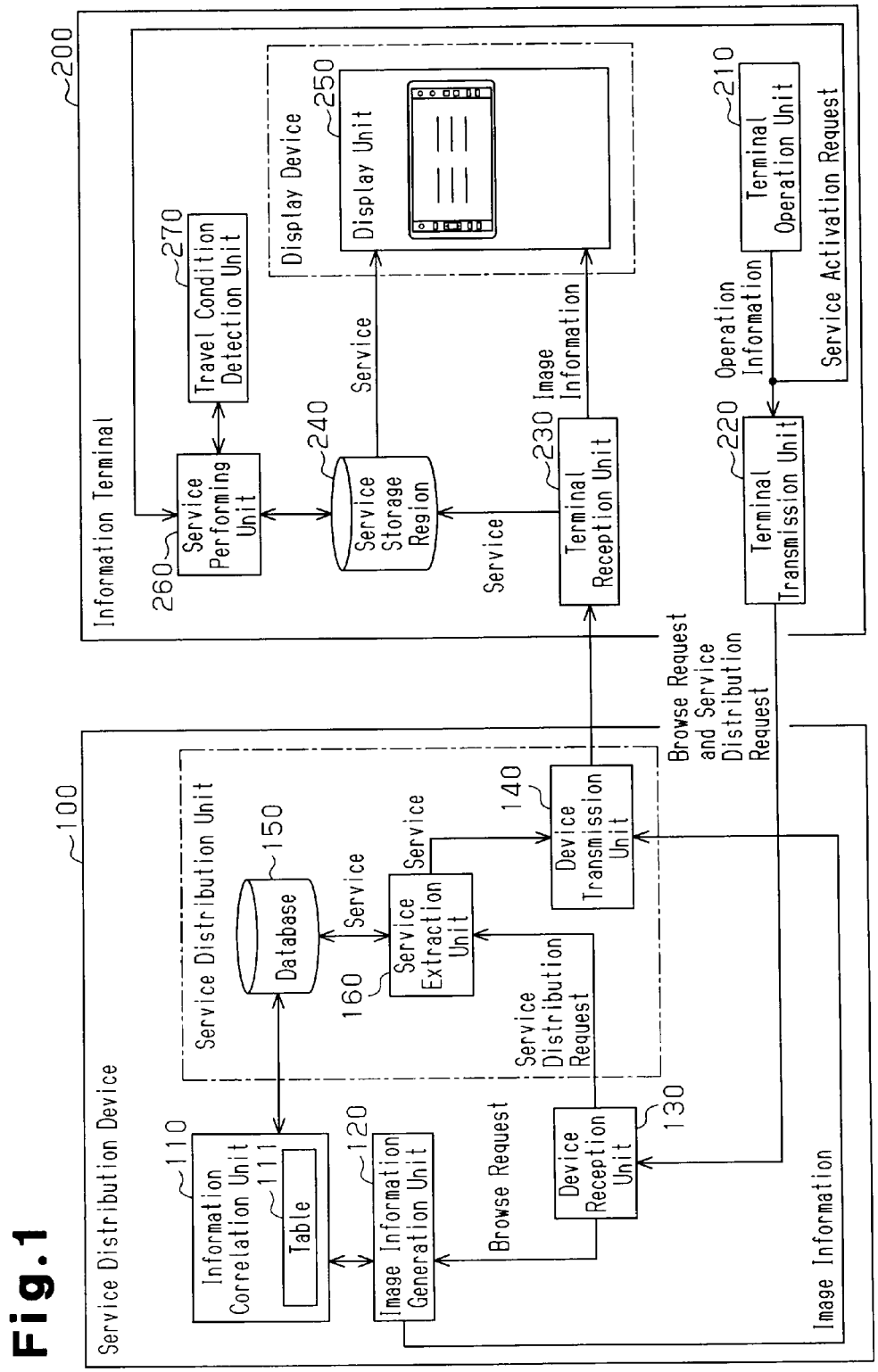
FIG. 1 is a block diagram showing an outlined configuration of a service distribution device and a service display device according to a first embodiment of the present invention.

As shown in FIG. 1, a service distribution device 100 of the present embodiment is a management center, which is connected via a network such as the internet to a vehicle-use information terminal 200 mounted on a vehicle. The service distribution device 100 manages a providing site that distributes to the information terminal 200 such services as vehicle-use contents or vehicle-use applications, which are used by this information terminal 200, for example.

That is, the service distribution device 100 includes an information correlation unit 110, which correlates information that denotes service utilization conditions in relation to the travel condition of the vehicle mounted with the information terminal 200, with services that are used in a terminal such as the information terminal 200. Further, the service distribution device 100 includes a database 150, which registers a plurality of types of services to be distributed to the information terminal 200. Taking into account the fact that services registered in such a database 150 are used in the information terminal 200 mounted on the vehicle, utilization conditions (travel restrictions) to restrict use in the information terminal 200 according to the travel condition of the vehicle are imposed on services that may affect handling of the vehicle by a driver.

The information correlation unit 110 correlates the information that denotes the service utilization conditions in relation to the travel condition of the vehicle mounted with the information terminal 200 with each service registered in the database 150 and appropriately registers the correlation information in a table 111.

Figures 2, 3:
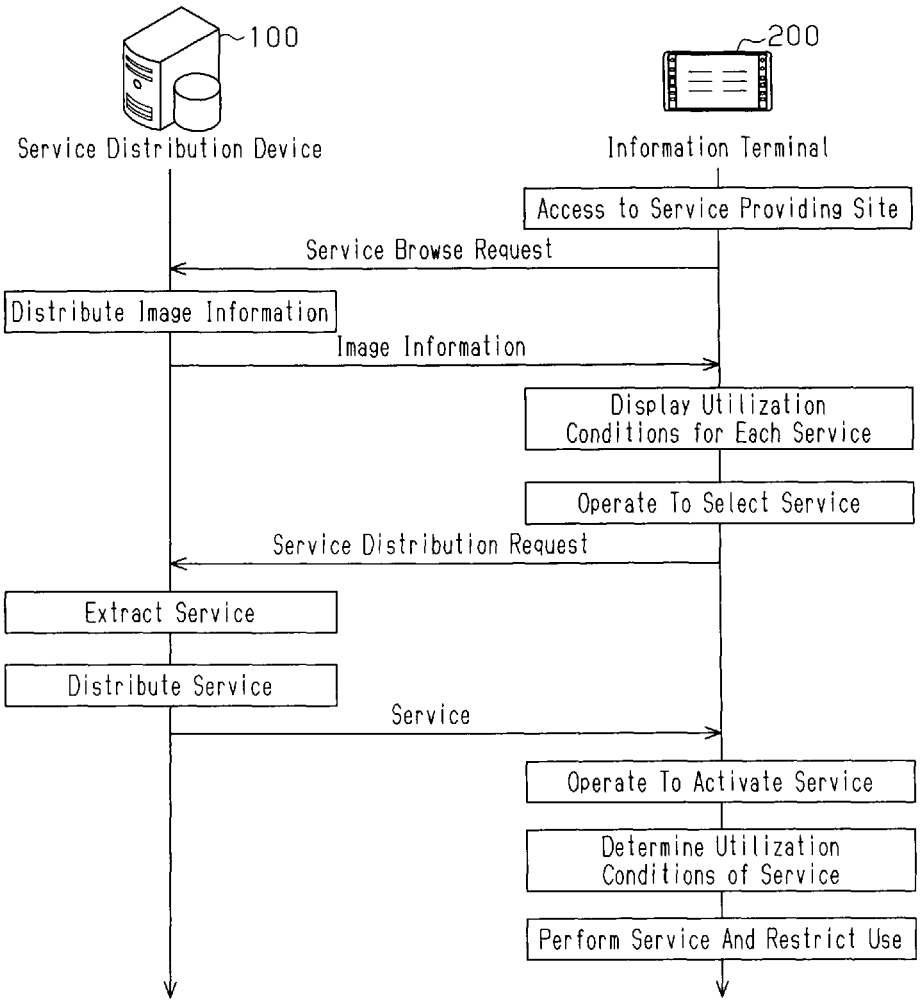
FIG. 2 is a diagram showing an example of contents of services registered in the table of the first embodiment and their utilization conditions.
FIG. 3 is a sequence diagram showing an example of operations of the service distribution device and the service display device of the first embodiment.

For example, as shown in FIG. 2, the table 111 registers the contents of services such as E-mail, SEKAI CAMERA (registered trademark. Meaning of "World Camera"), and Foreign Exchange Guide as the contents of the services of which use is restricted when the vehicle mounted with the information terminal 200 is travelling, in other words, the contents of names or the like of the services of which use is permitted to only when this vehicle is stopped. Among those services, SEKAI CAMERA is a service that provides to the user an experience in which additional information by a personal computer is superposed on the real world. The table 111 registers fuel display, which is an application about display of the fuel condition of the vehicle mounted with the information terminal 200 as the contents of the service that can be used always irrespective of the travel condition of the vehicle, in other words, the service on which no travel restrictions are imposed. Similarly, the table 111 registers the contents of the service such as an energy flow, which is an application for monitoring the flow of energy between the engine, the motor and the battery of a hybrid automobile, as the contents of the service on which no travel restrictions are imposed. Further, the table 111 registers, for example, the contents of the service such as an instantaneous fuel efficiency which is the service for providing information about the instantaneous fuel efficiency of the vehicle mounted with the information terminal 200 as the contents of the service of which use is temporarily restricted so that the driver can concentrate his attention to the field of view ahead of the vehicle under a travel environment such as when it is raining or when the vehicle is travelling at a predetermined speed or greater. That is, utilization restrictions are imposed under the constant conditions on the service that may affect the handling of the vehicle if it is used under such travel environment.

Further, the service distribution device 100 includes an image information generation unit 120 for generating image information capable of visibly displaying the utilization conditions of a service registered in such a table 111 on the information terminal 200 based on the information that denotes those utilization conditions. The image information generation unit 120 of the present embodiment generates the image information in a display format capable of simultaneously displaying the contents of a plurality of types of services that can be displayed on the information terminal 200. Further, if the types of services to be displayed simultaneously have the different utilization conditions, the image information generation unit 120 generates the image information in a display format that is specific to each of the service contents. When having acquired in a device reception unit 130 via the network a browse request transmitted from the information terminal 200 to browse the information denoting the service utilization conditions, such an image information generation unit 120 distributes the above generated image information via a device transmission unit 140 to the information terminal 200, which has sent the browse request. Such image information from the service distribution device 100 is distributed to the information terminal 200, which has sent the browse request each time it is sent from the information terminal 200.

Further, the service distribution device 100 includes a service extraction unit 160 for extracting a service of which distribution is requested by the information terminal 200 from the database 150 as response to a result of distribution of such image information. When having acquired from the device reception unit 130 a request for distribution of one through a plurality of services transmitted from the information terminal 200, the service extraction unit 160 extracts those requested one through the plurality of services from the service extraction unit 160. Then, the service extraction unit 160 distributes those extracted services via the device transmission unit 140 to the information terminal 200 that has sent the service distribution request.

In the present embodiment, the device transmission unit 140, the database 150, and the service extraction unit 160 make up the above service distribution unit.

The information terminal 200 includes a terminal operation unit 210 at which the user of this information terminal 200 performs an operation to request the service distribution device 100 to give a service browse screen, an operation to request services, an operation to activate those services and the like. The terminal operation unit 210 identifies which one of operations is operated by the user, the service browse screen request operation, the service request operation, or the service activation operation. Then, having identified the service browse screen request operation and the service request operation as the user operation contents based on a result of such identification, the terminal operation unit 210 outputs information about such operations to a terminal transmission unit 220, to cause this terminal transmission unit 220 to transmit this information to the service distribution device 100. Further, having identified the service activation operation as the user operation contents based on the result of this identification, the terminal operation unit 210 outputs information about this activation operation to a service performing unit 260, which activates and performs services and imposes utilization restrictions on them.

When having received the information about the service browse screen request operation or the service request operation from the terminal operation unit 210, the terminal transmission unit 220 requests the service distribution device 100 to download the service browse screen (browse request) or distribute services.

Further, the information terminal 200 includes a terminal reception unit 230, which receives image information or a service each distributed from the service distribution device 100 as response to a request for browsing or the service distribution from the terminal transmission unit 220. When having received the image information distributed from the service distribution device 100 as the response to the browse request from the terminal transmission unit 220, the terminal reception unit 230 outputs this received image information to a display unit 250, which visibly displays this image information. Further, when having received the service distributed from the service distribution device 100 as the response to the distribution request from the terminal transmission unit 220, the terminal reception unit 230 outputs this received information to a service storage region 240. That is, the service storage region 240 appropriately stores the service acquired from the service distribution device 100 via the terminal reception unit 230.

The display unit 250 is formed by an LCD and the like and. When the image information is input from the terminal reception unit 230, the display unit 250 visibly displays this image information. In the present embodiment, such image information, that is, information that denotes service utilization conditions is displayed on the display unit 250 as a screen to browse for services that can be distributed by the service distribution device 100.

In the present embodiment, the display unit 250 makes the above service display device.

Further, the above service performing unit 260 cooperates with a travel condition detection unit 270, which detects the travel condition of the vehicle mounted with the information terminal 200, to perform the services stored in the service storage region 240. That is, the travel condition detection unit 270 is formed by, for example, any kind of a sensor such as a GPS for acquiring latitude/longitude information of the automobile or a car speed sensor for detecting the travelling speed of the automobile. Then, the travel condition detection unit 270 detects the travel condition of the automobile based on the detection results by such sensor and outputs information about the detected travel condition to the service performing unit 260.

The service performing unit 260 performs the services stored in the service storage region 240 based on the information about the travel condition detected by the travel condition detection unit 270 and the utilization conditions prescribed on the various types of services. That is, having determined that the vehicle mounted with the information terminal 200 is travelling based on the detection results by the travel condition detection unit 270, the service performing unit 260 prohibits the use of the service of which use is prescribed on condition that the vehicle is stopped even if an operation to activate the service is performed by the user on the terminal operation unit 210. Similarly, having decided that the vehicle is travelling at a predetermined speed or greater, the service performing unit 260 prohibits the use of a service of which use is prescribed on condition that the vehicle is travelling at a speed less than the predetermined speed even if an operation to activate the service is performed on the terminal operation unit 210. However, the service performing unit 260 permits the activation of a service of which utilization conditions are not defined or such a service that the travel condition of the automobile satisfies its utilization conditions. That is, if operations to activate a service free of such restrictions are performed by the user on the terminal operation unit 210, the service performing unit 260 activates and performs the service in response to those activation operations, so that this performed service is provided to the user.

The following will describe an example of operations (actions) of the service distribution device and the service display device of the present embodiment with reference to FIG. 3.

As show in FIG. 3, first if the user of the information terminal 200 gains access to a service providing site, that is, the service distribution device 100 via the terminal operation unit 210 of this information terminal 200, the information terminal 200 sends out a browse request for browsing one or a plurality of services that can be distributed by the service distribution device 100.

When having received the service browse request sent out from the information terminal 200, the service distribution device 100 distributes image information denoting contents of the service generated by the image information generation unit 120 and its utilization conditions to the information terminal 200 that sent out the browse request.

When having received the image information distributed from the service distribution device 100, the information terminal 200 displays this received image information on the display unit 250. Accordingly, the display unit 250 provides image display of the information denoting whether each service can be used in relation to the travel condition of the vehicle before the information terminal 200 acquires the service from the service distribution device 100. Then, the user of the information terminal 200 selects a service that is desired to be downloaded from the service distribution device 100 based on the information displayed as an image on the display unit 250. That is, the user of the information terminal 200, in other words, the driver or passenger of the vehicle mounted with the information terminal 200 can requests the service distribution device 100 to distribute a service that can be acquired from the service distribution device 100 after recognizing beforehand whether the service can be used even in the travel condition of the present vehicle, for example, after recognizing it prior to downloading a program of this service.

If a request to distribute the thus selected service is made by the information terminal 200 to the service distribution device 100, the service extraction unit 160 in the service distribution device 100 extracts the service of which downloading is requested from the database 150. Then, the service extracted by the service extraction unit 160 is distributed from the service distribution device 100 to the information terminal 200 that has sent out the service distribution request.

If the user of the information terminal 200 operates to activate a service in such a manner, the information terminal 200 determines whether the service of which activation is operated can be used in the current travel condition of the vehicle mounted with this information terminal 200. The information terminal 200 performs the service or restricts its use based on a result of the determination according to the utilization conditions of each of the services.

PRACTICAL EXAMPLES

The following will describe in more detail specific examples of the service distribution device and the service display device according to the present invention by using practical examples.

First Practical Example

In the present practical example, the image information generation unit 120 generates image information in a format that denotes services having the different utilization conditions for each group of the utilization conditions, that is, in the display format denoting them in each of the groups, as image information denoting the contents of those services having the different utilization conditions. When having received the image information generated by this image information generation unit 120 from the service distribution device 100, the display unit 250 provides image display of this image information on this display unit 250.

Figure 4:
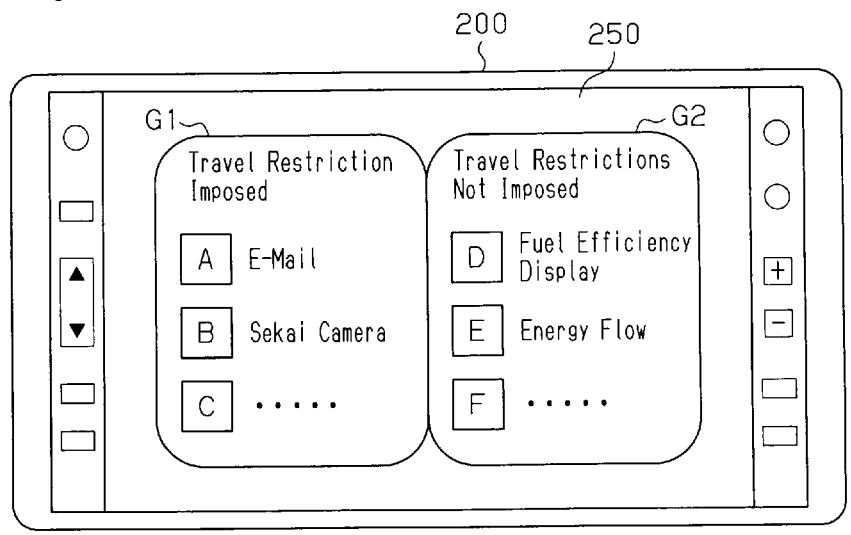
FIG. 4 is a diagram showing an example of a format for displaying image information displayed on a display unit in a first practical example of the service distribution device and the service display device according to the present invention.

As a result, as exemplified in FIG. 4, the display unit 250 provides group-specific display of a plurality of types of services A to F, which can be distributed by the service distribution device 100 separately as a group G1 (travel restrictions imposed) of which use is prohibited when the vehicle is travelling, that is, on which the travel restrictions are imposed and a group G2 (travel restrictions not imposed) on which the travel restrictions are not imposed.

This permits the display unit 250 of the present practical example to visibly display the services A, B, C, which are the names (code names) of the services subject to the travel restrictions and the information denoting their contents E-mail, SEKAI CAMERA, . . . as the group G1 services not subject to the travel restrictions. Similarly, the services D, E, F, which are the names of the services not subject to the travel restrictions and the information denoting their contents Fuel Efficiency Display, Energy Flow, are visibly displayed as the group G2 services not subject to the travel restrictions. Therefore, the user of the information terminal 200 can recognize beforehand the services subject to the travel restrictions among those, which can be acquired in the service distribution device 100, that is, the services, which have no availability in the travelling vehicle.

Second Practical Example

In the present practical example, the image information generation unit 120 generates, as image information denoting the contents of services having the different utilization conditions, the image information in a display format that denotes those services having the different utilization conditions in different colors for the different utilization conditions. When having received the image information generated by this image information generation unit 120 from the service distribution device 100, the display unit 250 provides image display of this image information on this display unit 250.

Figure 5:
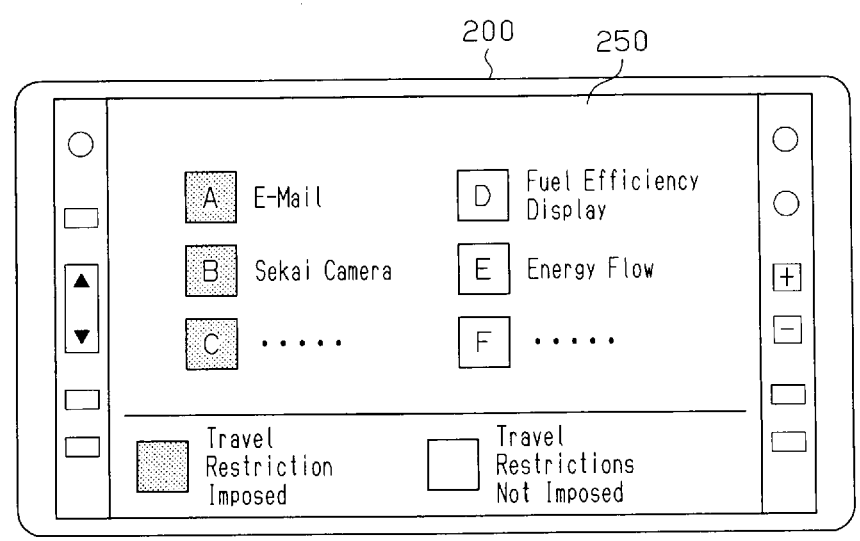
FIG. 5 is a diagram showing an example of a format for displaying image information displayed on a display unit in a second practical example of the service distribution device and the service display device according to the present invention.

As a result, as exemplified in FIG. 5, the display unit 250 displays each service subject to the travel restrictions so that the use may be prohibited when the vehicle is travelling and each service not subject to the travel restrictions among a plurality of types of services A to F, which can be distributed by the service distribution device 100, in different colors. It permits the display unit 250 of the present practical example to light up in display the name itself or the square frame neighboring on the left of each of the services A, B, C, which are the names of the services subject to the travel restrictions as the travel restriction-imposed services in, for example, the red color. Further, the name or the square frame neighboring on the left of each of the services D, E, F, . . . , which are the names of the services not subject to the travel restrictions as the travel restriction-free services is lit up in display in, for example, the blue color.

If a field on the display unit 250 below other than the field for those services' name and contents is lit up in display in red, that means travel restrictions are imposed, and if it is lit up in blue, that means travel restrictions are not imposed. Therefore, the display unit 250 of the present practical example displays the services that can be distributed by the service distribution device 100 in different colors in accordance with their utilization conditions, thereby permitting the user to recognize beforehand the availability of each service in the information terminal 200 before the user acquires it from the service distribution device.

Third Practical Example

In the present practical example, the image information generation unit 120 generates image information that takes on a display format capable of providing blinking display of names and contents of services, among the above services, of which use is temporarily restricted under constant conditions such as a condition where the vehicle is travelling at least at a predetermined speed, in the rain, or in an urban area as the image information displaying those services. The image information generation unit 120 of the present practical example generates image information that takes on a display format displaying the services having other utilization conditions in respectively different colors as in the case of the second practical example.

When having received the image information generated by this image information generation unit 120 from the service distribution device 100, the display unit 250 provides image display of this image information.

Figure 6:
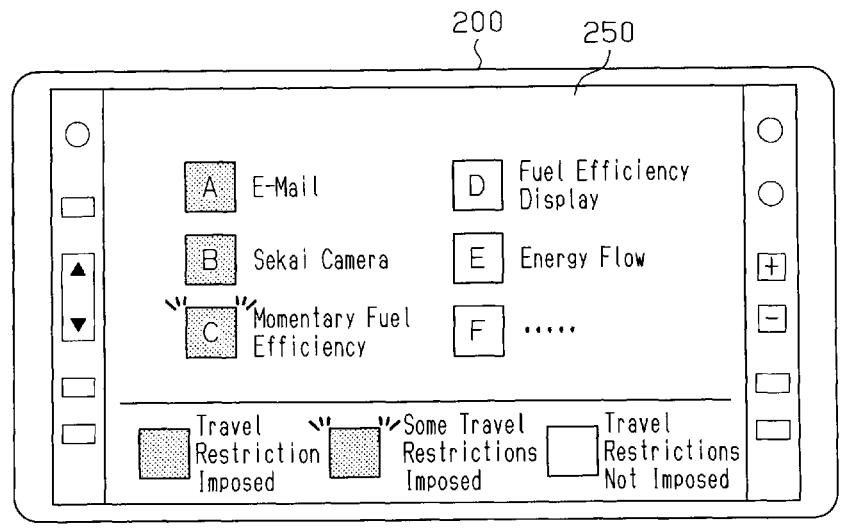
FIG. 6 is a diagram showing an example of a format for displaying image information displayed on a display unit in a third practical example of the service distribution device and the service display device according to the present invention.

As a result, as exemplified in FIG. 6, the display unit 250 provides blinking display of the name or the square frame neighboring on the left of a service C that information about an instantaneous fuel efficiency, of which use is temporarily restricted, can be provided among the plurality of types of services A to F, which can be distributed by the service distribution device 100. Further, in a field (lower field in the figure) other than the field of the names and contents of those services, the services blinking in display are indicated to the effect that their use is temporarily restricted under specific conditions. In such a manner, the display unit 250 of the present practical example can permit the user to recognize beforehand not only whether the travel restrictions are imposed but also whether the service that can be acquired from the service distribution device 100 is temporarily restricted in use in accordance with the travel condition of the vehicle by referencing blinking display of the name of the service.

Fourth Practical Example

In the present practical example, the image information generation unit 120 generates image information in a display format capable of selecting constantly lit presentation or blinking presentation of services having the different utilization conditions as the image information denoting contents of those services having the different utilization conditions. When having received the image information generated by this image information generation unit 120 from the service distribution device 100, the display unit 250 provides image display of this image information.

Figure 7:
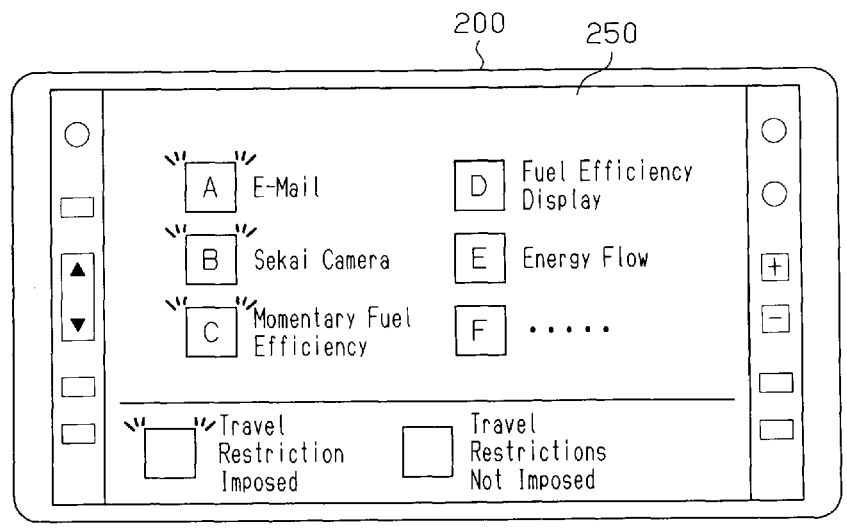
FIG. 7 is a diagram showing an example of a format for displaying image information displayed on a display unit in a fourth practical example of the service distribution device and the service display device according to the present invention.

As a result, as exemplified in FIG. 7, the display unit 250 displays the names or the left-side neighboring square frames of a service subject to travel restrictions so that its use may be prohibited when the vehicle is travelling and a service not subject to the travel restrictions among the plurality of types of services A to F, which can be distributed by the service distribution device 100 in respectively different lighting formats. Accordingly, in the present practical example, the services A, B, C, . . . , which are the names of the services subject to the travel restrictions and the square frames neighboring on the left of them are displayed, for example, as blinking as the services subject to the travel restrictions. The services D, E, F, . . . , which are the names of the services not subject to the travel restrictions and the square frames neighboring on the left of them are, for example, constantly lit in display as the services not subject to the travel restrictions. Further, in a field (lower field) other than the field of the names and contents of those services, the services blinking in display are indicated to the effect that they are subject to travel restrictions and the services constantly lit in display are indicated to the effect that they are not subject to travel restrictions. In such a manner, the display unit 250 of the present practical example can permit the user to recognize beforehand the availability of each service in the information terminal 200 before the user acquires it based on whether its contents are blinking by displaying the services that can be distributed by the service distribution device 100 in different lighting formats in accordance with their utilization conditions.

Fifth Practical Example

In the present practical example, the image information generation unit 120 generates image information in a display format in which services having the different utilization conditions are provided with different identifiers as the image information denoting the contents of the services having the different utilization conditions. When having received the image information generated by this image information generation unit 120 from the service distribution device 100, the display unit 250 provides image display of this image information.

Figure 8:
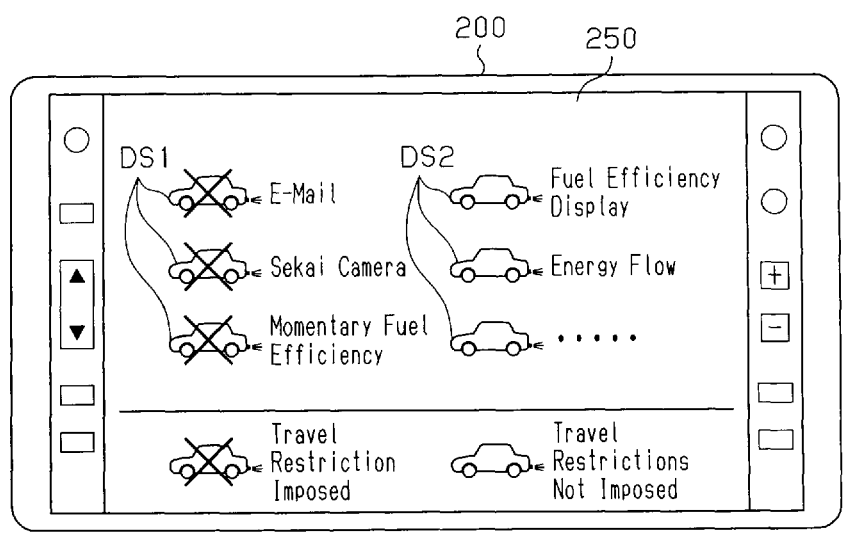
FIG. 8 is a diagram showing an example of a format for displaying image information displayed on a display unit in a fifth practical example of the service distribution device and the service display device according to the present invention.

As a result, as exemplified in FIG. 8, the display unit 250 adds in display an identifier DS1 to the effect that the relevant service is subject to the travel restrictions to the position neighboring (left-side neighboring in the figure) the name of each of services A, B, C, . . . , which are the names of the services subject to the travel restrictions among the plurality of types of services A to F, which can be distributed by the service distribution device 100. Further, the display unit 250 adds in display an identifier DS2 to the effect that the relevant service is not subject to the travel restrictions to the position neighboring to the name of each of services D, E, F, . . . , which are the names of the services not subject to the travel restrictions. For example, the identifier DS2 includes only vehicle marks while the identifier DS1 has its vehicle marks indicated by x. In a field (lower field) other than that for the name and the contents of such services, the identifier DS1 is displayed to the effect that the relevant service is subject to travel restrictions and the identifier DS2 is displayed to the effect that the relevant service is not subject to travel restrictions. Therefore, the display unit 250 of the present practical example displays the different identifiers DS1 and DS2 added to the services that can be distributed by the service distribution device 100 for each of their contents, thereby permitting the user to recognize the availability of each service in the information terminal 200 before the user acquires it based on those identifiers DS1 and DS2.

As described above, the following advantages can be obtained by the service distribution device and the service display device according to the present embodiment.

(1) The service distribution device 100 correlates information denoting service utilization conditions in relation to travel condition of the vehicle mounted with the information terminal 200 with the service that can be distributed by this service distribution device 100. The service distribution device 100 distributes the correlated information denoting the service utilization conditions along with contents of the relevant services to the information terminal 200. Accordingly, the user (user) of the information terminal 200 can recognize beforehand the availability of the service to be used in this information terminal 200 before acquiring it from the service distribution device 100. This enables the user to acquire the service from the service distribution device 100 after the user recognizes its availability, eventually improving the convenience of the services.

(2) The service distribution device 100 distributes information denoting whether a service can be used for the travel condition of the vehicle as the information denoting the service utilization conditions in relation to the travel condition of the vehicle. Accordingly, the information terminal 200 can visibly display an acquirable service and whether it can be used on the display unit 250. This enables the user to recognize beforehand whether the desired service can be used before this service is acquired by the information terminal 200 from the service distribution device 100.

(3) The service distribution device 100 includes the database 150 in which a plurality of types of services are registered beforehand. This service distribution device 100 correlates each of the services registered in the database 150 with the information denoting the utilization conditions for the vehicle travel condition, to distribute the information denoting the contents of the service extracted from the database 150 and its utilization conditions to the information terminal 200. As a result, the service distribution device 100 can permit the user of the information terminal 200 to recognize whether each of a plurality of types of services having the different utilization conditions can be used even in the case of distributing those services from the service distribution device 100 to the information terminal 200.

(4) The service distribution device 100 distributes a vehicle-use content or vehicle-use application as the service so that such a service may be performed in the vehicle-use information terminal 200. This enables the user of the information terminal 200 to recognize beforehand the availability of the vehicle-use content or vehicle-use application liable to be subject to the travel restrictions, eventually improving their convenience.

(5) The image information generation unit 120 in the service distribution device 100 generates image information in a display format capable of simultaneously displaying the contents of a plurality of types of services and generates contents (names) of the services having the different utilization conditions as image information in respectively different display formats. Therefore, even if there are a plurality of types of services to be displayed, the display unit 250 in the information terminal 200 for displaying such image information can visibly display those services simultaneously and in a mode in which their utilization conditions can be distinguished from each other. Further, the display unit 250 can display information denoting the service contents and utilization conditions to the user of the information terminal 200 only by displaying the image information distributed from the service distribution device 100. As a result, the service distribution device 100 can permit the user to recognize the information denoting the service contents and utilization conditions by using the existing display device, thereby expanding general versatility of the service distribution device 100.

(6) In the first practical example in FIG. 4, the image information generation unit 120 in the service distribution device 100 generates image information in a format that denotes services having the different utilization conditions for each group of the utilization conditions, in the display format denoting them in each of the groups, as image information denoting the contents of those services having the different utilization conditions. As a result, when displaying the plurality of types of services simultaneously, the display unit 250 for displaying the image information in such a display format can provide group-specific display of the services subject to the travel restrictions and the services not subject to the travel restrictions separately from each other. Therefore, the display unit 250 can provide list display of the plurality of types of services having the different utilization conditions in such a mode that those utilization conditions can be distinguished from each other.

(7) In the second practical example in FIG. 5, the image information generation unit 120 in the service distribution device 100 generates as image information denoting the contents of services having the different utilization conditions the image information in a display format that denotes those services having the different utilization conditions in different colors. As a result, when displaying the plurality of types of services simultaneously, the display unit 250 for displaying the image information in such a display format displays can display the services subject to the travel restrictions and the services not subject to the travel restrictions in different colors. Therefore, the display unit 250 can permit the user of the information terminal 200 to recognize the services having the different utilization conditions by using the user's color vision.

(8) In the third practical example in FIG. 6, the image information generation unit 120 in the service distribution device 100 generates image information that takes on a display format capable of providing blinking display of names and contents of services of which use is temporarily restricted under constant conditions as the image information displaying those services. As a result, the display unit 250 displaying such image information can display the services of which use is temporarily restricted in such a manner that they can be distinguished from the services temporarily subject to the travel restrictions and the services uniformly subject to the travel restrictions. This enables the display unit 250 to permit the user of the information terminal 200 to recognize beforehand the utilization conditions of services to which special utilization conditions are applied.

(9) In the fourth practical example in FIG. 7, the image information generation unit 120 in the service distribution device 100 generates image information in a display format capable of selecting constantly lit presentation or blinking presentation of services having the different utilization conditions as the image information denoting contents of those services having the different utilization conditions. As a result, when displaying a plurality of types of services simultaneously, the display unit 250 displaying the image information in such a display format can display the services subject to the travel restrictions and the services not subject to the travel restriction in the different lighting modes. This enables the information terminal 200 to permit the user of the information terminal 200 to recognize the services having the different utilization conditions based on whether they are blinking on the display unit 250.

(10) In the fifth practical example in FIG. 8, the image information generation unit 120 in the service distribution device 100 generates image information in a display format in which services having the different utilization conditions are provided with the different identifiers DS1 and DS2 as the image information denoting the contents of the services having the different utilization conditions. When displaying a plurality of types of services simultaneously, the display unit 250 displaying the image information in such a display format can display the services subject to the travel restrictions and the services not subject to the travel restrictions in condition where they are provided with the different identifiers DS1 and DS2. As a result, the information terminal 200 can permit the user of the information terminal 200 to recognize the services having the different utilization conditions based on the identifiers DS1 and DS2 added to the services to be displayed on the display unit 250. Further, in the present practical example, since the identifiers DS1 and DS2 denoting the vehicle travel condition are added as the identifiers denoting whether the travel restrictions are imposed, the user of the information terminal 200 can easily recognize whether the travel restrictions are imposed on each of the services only by checking (visually checking) those identifiers DS1 and DS2.

(Second Embodiment)

Figure 9:
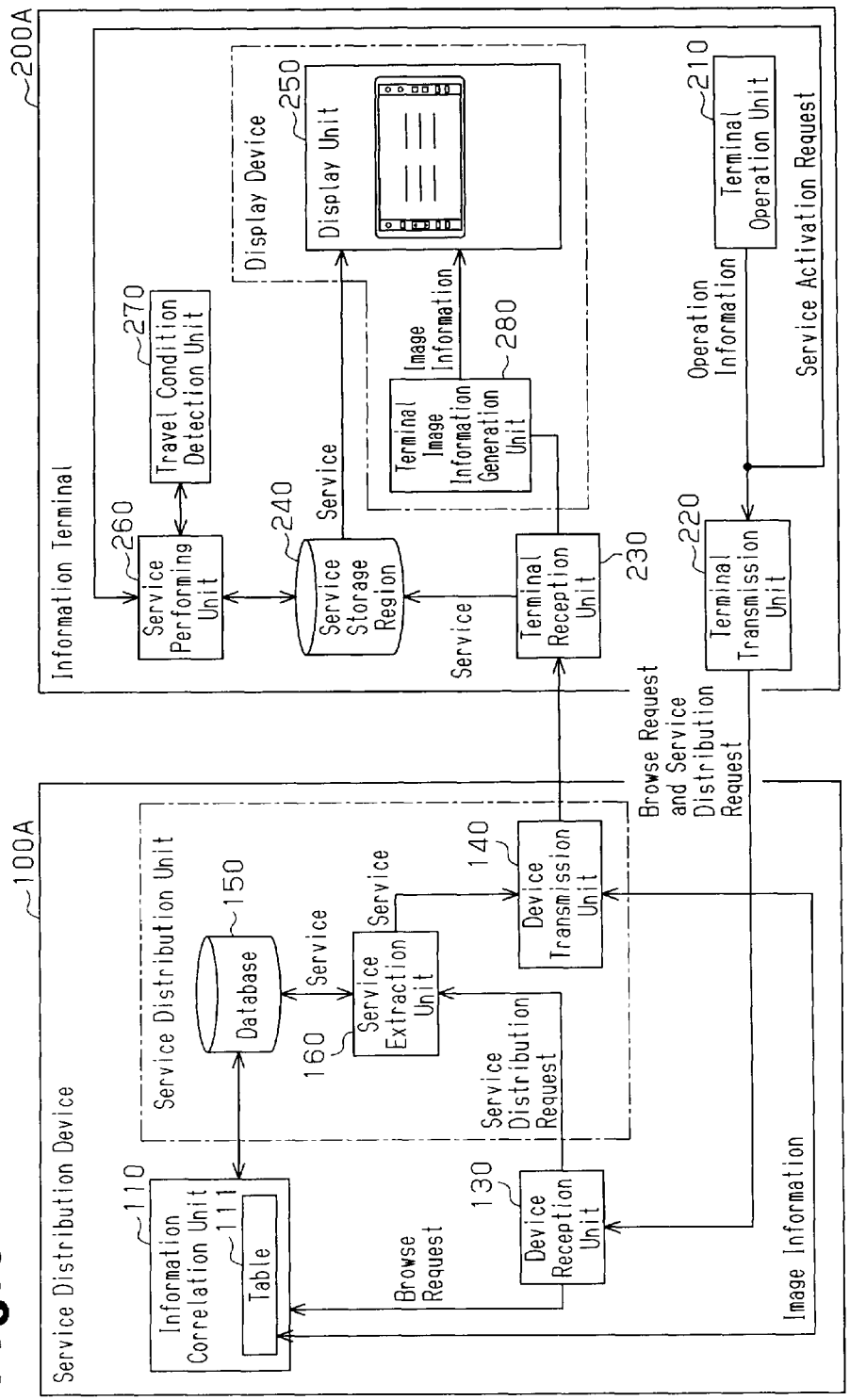
FIG. 9 is a block diagram showing an outlined configuration of a service distribution device and a service display device according to a second embodiment of the present invention.

The following will describe a second embodiment of the service distribution device and the service display device according to the present invention with reference to FIG. 9. The second embodiment has the same basic configuration as the first embodiment except that image information to be displayed on a display unit 250 is generated by an information terminal 200A.

FIG. 9, which is similar to FIG. 1 above, shows an outlined configuration of the service distribution device and the service display device according to the second embodiment. In FIG. 9, the identical reference numerals to FIG. 1 are each given to the identical components, and repetitive description on the identical components will be omitted.

That is, as shown in FIG. 9, in the present embodiment, the service distribution device 100A is configured not to include the image information generation unit 120 and the information terminal 200A is configured to include a terminal image information generation unit 280. When having received an inquiry about information that denotes contents of services that can be distributed by the service distribution device 100A and utilization conditions of the services, the service distribution device 100A outputs contents of this inquiry to an information correlation unit 110 via a device reception unit 130.

In response to the inquiry from the information terminal 200A, the information correlation unit 110 extracts information that denotes the contents of services registered in a table 111 and utilization conditions of the services. Then, the information correlation unit 110 distributes the extracted information via a device transmission unit 140 to the information terminal 200A that has made the inquiry.

When having received, at a terminal reception unit 230, the information containing the utilization conditions or the like of the service distributed from the service distribution device 100A, the information terminal 200A outputs the received information to the terminal image information generation unit 280 that has a function pursuant to the image information generation unit 120. Based on this received information, the terminal image information generation unit 280 generates image information that can be visibly displayed on the display unit 250. The terminal image information generation unit 280 of the present embodiment also generates image information in the same format as that of an arbitrary one of the above-described first through fifth practical examples generated by the image information generation unit 120.

In the present embodiment, the display device is formed by the display unit 250 and the terminal image information generation unit 280.

The terminal image information generation unit 280 outputs the generated image information to the display unit 250. The display unit 250 in turn displays the image information input from the terminal image information generation unit 280. It permits, for example, the display unit 250 to display the same image as that in the display format shown in FIGS. 4 to 8 above. As a result, the user of the information terminal 200A can recognize beforehand the utilization conditions of a service that can be acquired from the service distribution device 100A prior to acquiring it from the service distribution device 100A based on the image information generated by the terminal image information generation unit 280 mounted in the information terminal 200A.

As described above, in conjunction with advantages pursuant to the advantages (1) to (4) and (6) to (10) described above, the service distribution device and the service display device according to the present embodiment gives the following advantages in place of the advantage (5) described above.

(5A) The terminal image information generation unit 280 mounted in the information terminal 200A generates image information for displaying information denoting the contents of services and their utilization conditions. Accordingly, the service distribution device 100A only needs to distribute the information denoting the service utilization conditions to the information terminal 200A that has made an inquiry. Further, only by acquiring the information denoting the service utilization conditions, the information terminal 200A can, by itself, generate image information capable of identifying the service utilization conditions to display the generated image information to the user. This expands the modes of the utilization format as the service distribution device and the service display device.

(Third Embodiment)

Figure 10:
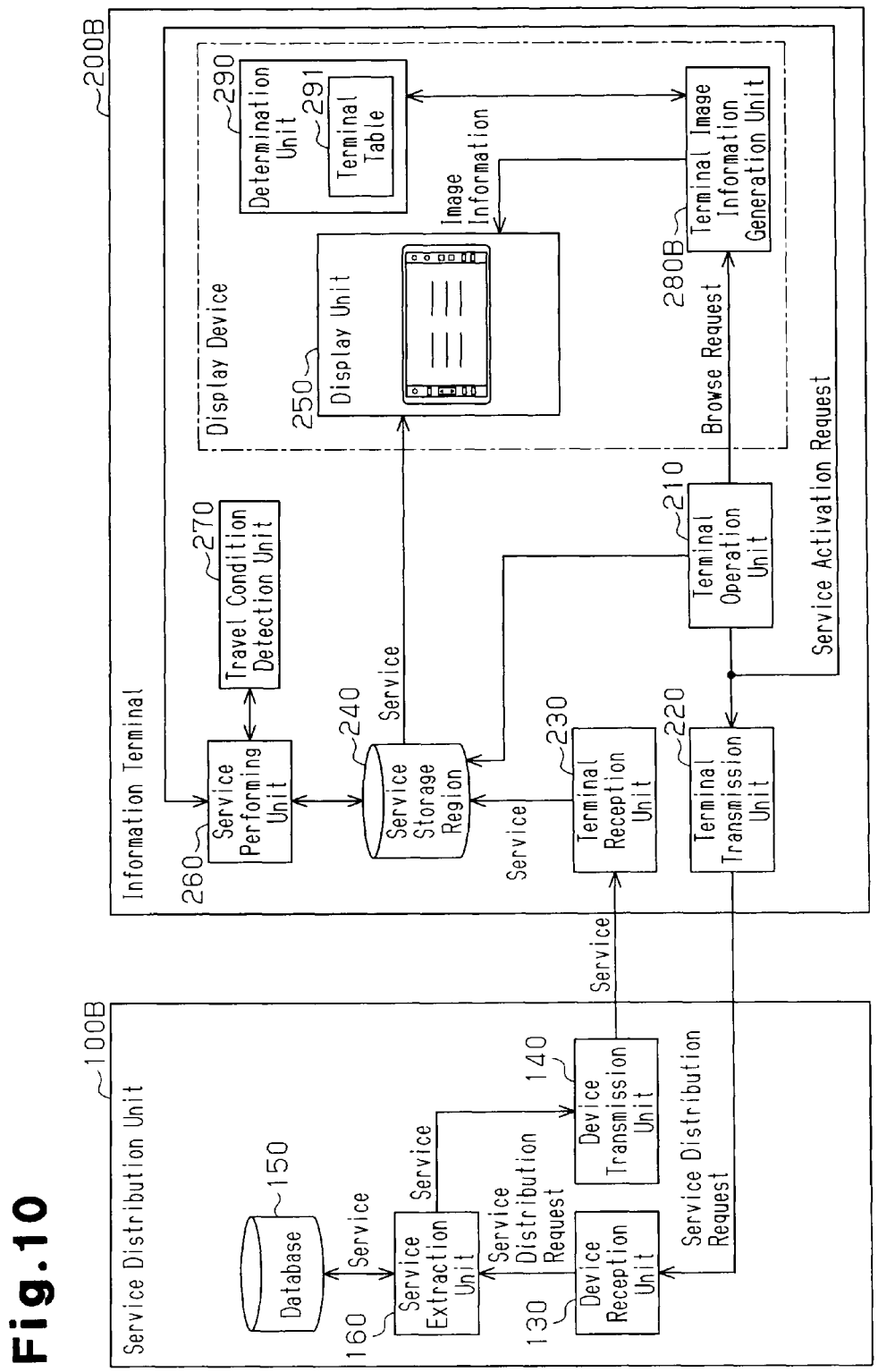
FIG. 10 is a block diagram showing an outlined configuration of a service distribution device and a service display device according to a third embodiment of the present invention.

The following will describe a third embodiment of the service distribution device and the service display device according to the present invention with reference to FIG. 10. The third embodiment also has the same basic configuration as the first embodiment except for some differences.

FIG. 10, which is similar to FIG. 1 above, shows an outlined configuration of the service distribution device and the service display device according to the third embodiment. In FIG. 10, the identical reference numerals to FIG. 1 are each given to the identical components, and repetitive description on the identical components will be omitted.

As shown in FIG. 10, the service distribution device 100B of the present embodiment is configured not to include the information correlation unit 110 or the image information generation unit 120, and only distributing services to an information terminal 200B that has made a request for distribution.

The display unit mounted on the information terminal 200B of the present embodiment includes the display unit 250 and a terminal image information generation unit 280B, which has a function pursuant to the image information generation unit 120. Further, the display device includes an identification unit 290 for identifying service utilization conditions and a terminal table 291, which registers the contents of the plurality of types of services and their utilization conditions, which are exemplified in FIG. 2 above. Of those, the identification unit 290 references the utilization conditions registered in the terminal table 291, thereby identifying the utilization conditions for each of the services in accordance with the vehicle travel condition. Further, in the present embodiment, based on a result of such identification on the utilization conditions of each service by the identification unit 290, the terminal image information generation unit 280B generates image information for displaying the contents of each service and its utilization conditions.

In the information terminal 200B of the present embodiment, if an operation to request for a screen to browse services that can be used in the information terminal 200B is performed by the user on a terminal operation unit 210, information about the request operation is input to the terminal image information generation unit 280B.

When having received the information about the browse screen request operation, the terminal image information generation unit 280B acquires information that denotes the utilization conditions of each of service as a result of identification by the identification unit 290. Based on the acquired information, the terminal image information generation unit 280B generates image information for displaying contents denoted by the information on the display unit 250 and outputs the generated image information to the display unit 250. In such a manner, the display unit 250 displays the image information input from the terminal image information generation unit 280, thereby displaying an image in the display format shown in, for example, FIGS. 4 to 8 on the display unit 250. This enables the user of the information terminal 200B to recognize beforehand the utilization conditions of a service that can be acquired from the service distribution device 100B prior to acquiring it from the service distribution device 100B based on the image information generated by the terminal image information generation unit 280 mounted in this information terminal 200B.

In such a manner, if the user operates to select a service or to request a service on the terminal operation unit 210 based on an image displayed on the display unit 250, information about this operation is distributed via the terminal transmission unit 220 to the service distribution device 100B as a service distribution request to the service distribution device 100B. Then, the service distribution device 100B extracts the relevant service from the database 150 and distributes the extracted service via the device transmission unit 140 to the information terminal 200B that has sent the distribution request.

As described above, in conjunction with advantages pursuant to the advantages (2) to (4) and (6) to (10) described above, the service distribution device and the service display device according to the present embodiment gives the following advantages in place of the advantages (1) and (5) described above.

(1B) The information terminal 200B is configured to includes the identification unit 290, which can identify service utilization conditions, and the terminal table 291 in which each service is registered in condition where it is correlated with information denoting the utilization conditions. Furthermore, the information terminal 200B is configured to include the terminal image information generation unit 280B, which generates image information based on a result of identification by the identification unit 290. If the user of the information terminal 200B makes a request for service browsing to the information terminal 200B, the identification unit 290 cooperates with the terminal table 291 and the terminal image information generation unit 280B to generate image information that can be visibly displayed on the display unit 250 so that the generated image information may be displayed on the display unit 250. Therefore, the information terminal 200B is able by itself to cause the display unit 250 to display information denoting the contents of services that can be acquired by this information terminal 200B from the service distribution device 100B and their utilization conditions. This enables the information terminal 200B, which serves as a recipient of the service, to grasp the utilization conditions of each of the services even if the service distribution device 100B serving as a service distribution source does not grasp the utilization conditions of the services for the vehicle condition, that is, even if the service distribution device 100B is an existing service distribution device.

(Other Embodiments)

The above embodiments may each be modified as follows.

In the above second practical example, the name of a service subject to the travel restrictions has been lit up in red and that of a service not subject to the travel restrictions is lit up in blue. The present invention is not limited thereto; the color that indicates the name of each service may be arbitrarily selected and set.

In the above fourth practical example, the name of a service subject to the travel restrictions is displayed in blinking presentation and that of a service not subject to the travel restrictions is displayed in constantly lit presentation. The present invention is not limited thereto; the name of a service subject to the travel restrictions may be displayed constantly lit presentation and that of a service not subject to the travel restrictions may be displayed in blinking presentation.

The above fifth practical example uses the identifiers DS1 and DS2 as identifiers which denote service utilization conditions. The present invention is not limited thereto; the identifier denoting the service utilization conditions only needs to be capable of explicitly denoting the service utilization conditions for the vehicle travel condition, for example, x may simply be added to a service name as an identifier of the service subject to the travel restrictions. Similarly, for example, ○ may simply be added to a service name as an identifier of the service subject not to the travel restrictions or a service free of the utilization restrictions. In this case also, the user of the information terminal 200 (hereinafter appropriately including 200A and 200B shown in FIGS. 9 and 10 respectively) can easily determine whether each service is subject to the travel restrictions based on those identifiers. Additionally, the identifier denoting whether the travel restrictions are imposed only needs to be capable of determining whether the travel restrictions are imposed.

Figure 11:
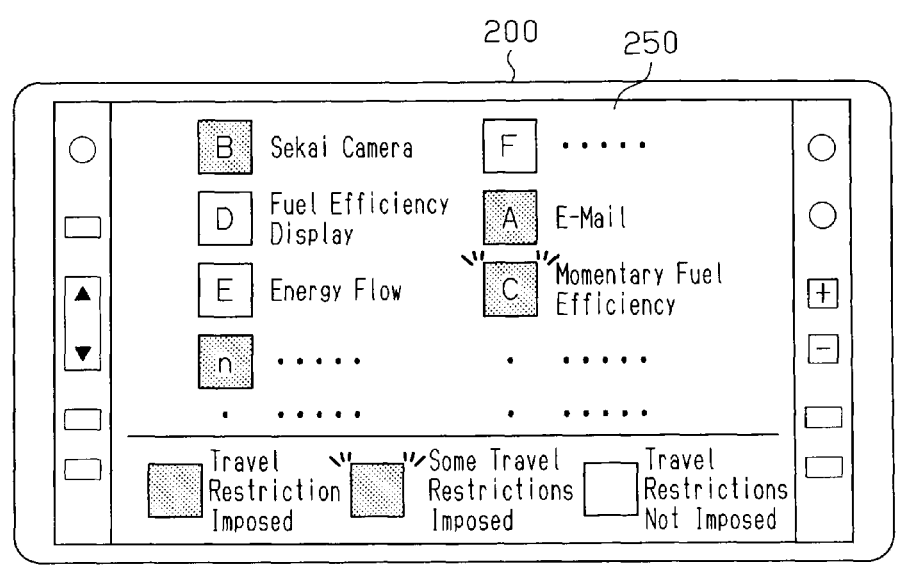
FIG. 11 is a diagram showing an example of a format for displaying image information displayed on a display unit and a service display device according to another embodiment of the service distribution device of the present invention.

The above second through fifth practical examples provide list display of the contents of services having the different utilization conditions and those utilization conditions subdivided into two groups of travel restrictions imposed and travel restrictions not imposed on the left half of the screen and the right half of the screen respectively, and also provide identification display by use of different colors, by selection of constantly lit presentation and blinking presentation, or by use of the different identifiers. The present invention is not limited thereto; it is of course possible to display the services and their utilization conditions in arbitrary order without grouping the contents of the services and their utilization conditions displayed on the display unit 250 as shown in FIG. 11, for example, similar to FIGS. 4 to 8.

The formats for displaying image information pieces generated respectively by the image information generation unit 120, the terminal image information generation unit 280, and the terminal image information generation unit 280B along with the mode for displaying the contents and utilization conditions of services to be displayed on the display unit 250 are arbitrary, so that for example, the display formats given in the above first through fifth practical examples may be combined appropriately. Further, the image information to be displayed on the display unit 250, not limited to but, only needs to be capable of displaying the services having the different utilization conditions in their respective display modes.

Further, in accordance with the travel condition of the vehicle mounted with the information terminal 200, which is detected by, for example, the travel condition detection unit 270, the display unit 250 can provide image display in which the travel condition is reflected. For example, if it is decided that the automobile is travelling based on the result of detection by the travel condition detection unit 270, the display unit 250 displays, for example, only the contents of E-mail and SEKAI CAMERA, which are the contents of services of which use is restricted in blinking presentation and the contents of the other services in constantly lit presentation, in the above examples shown in FIGS. 4 and 5. If the services can all be used in the current vehicle travel condition because the automobile is stopped, the display unit 250 displays the contents of all of the services in constantly lit presentation. Similarly, if the automobile is travelling, the display unit 250 can display only the contents of Fuel Efficiency and Energy Flow of utilizable services in blinking presentation and the contents of the other services in constantly lit presentation in the above examples shown in FIGS. 4 and 5. This enables the display unit 250 to display whether the various types of services that vary with the vehicle travel condition can be used by reflecting the condition where the vehicle travel condition, thereby improving sophisticated visibility of the service utilization conditions.

Further, although the above first through fifth practical examples display the respective service names in their respectively different display formats, the combination of the contents of a plurality of services may be displayed in their respectively different display format.

The above embodiments employ the configuration to mount the display unit 250 (display device) in the information terminal 200. The present invention is not limited to thereto; a configuration in which the information terminal 200 does not include the display device may be employed so that information can be transferred between the display device and the information terminal 200 as separate devices.

In the above third embodiment, the identification unit 290 in the information terminal 200B is configured to identify service-specific utilization conditions based on the information denoting the utilization conditions of the services registered in the terminal table 291. The present invention is not limited to thereto; the terminal table 291 may be omitted from the information terminal 200B if the identification unit 290 can identify the service-specific utilization conditions by using a program such as an if statement, for example. Further, even in the case of a configuration in which the terminal table 291 is omitted from the information terminal 200B, the information terminal 200B only needs to be able to generate image information to be displayed on the display unit 250 based on the information denoting the contents and utilization conditions of the services registered in the terminal table 291.

In the above embodiments, the service distribution device 100 (hereinafter appropriately including 100A and 100B shown in FIGS. 9 and 10 respectively) is configured to include the database 150 in which a plurality of types of services are registered, to correlate each of those services registered in the database 150 with its utilization conditions for the vehicle travel condition. The present invention is not limited to thereto; a service distributed by the service distribution device 100 may be a type of service and a configuration in which the database 150 is omitted may be employed.

In the above first and second embodiments, the service distribution device 100 is configured to include the table 111 to generate image information to be displayed on the display unit 250 based on the information denoting the contents of the services registered in this table 111 and their utilization conditions. The present invention is not limited to thereto; the table 111 may be omitted from the service distribution device 100 so that the information correlation unit 110 may appropriately identify the utilization conditions of each service to generate the image information by using the information denoting those identified service utilization conditions.

Figures 12A, 12B:
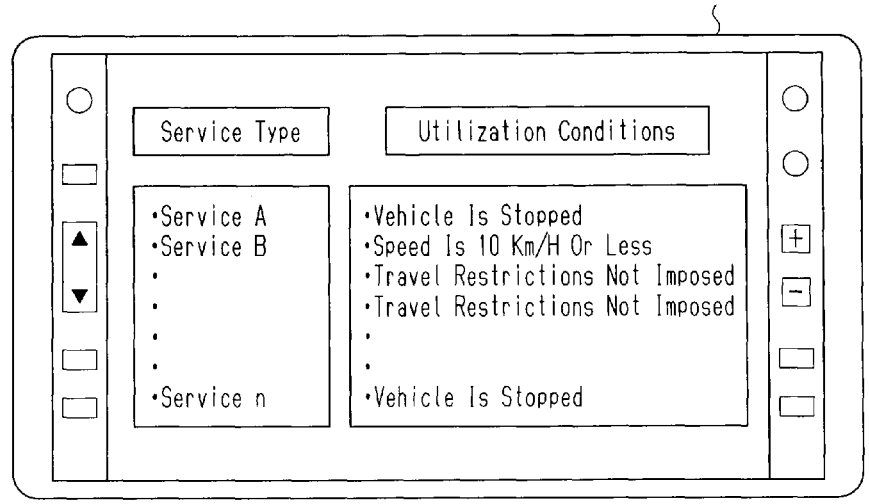
FIG. 12($a$) is table showing an example of contents of services registered in the table and their utilization conditions according to a further embodiment of the present invention.

In the above embodiments, the display image to be displayed on the display unit 250 is information denoting contents of each service and its utilization conditions, that is, whether the service is subject to the travel restrictions (whether it can be used). The present invention is not limited to thereto; a table shown in FIG. 12(*a*), which is a figure changed from FIG. 2 above, may be used as the table 111 or the terminal table 291, to register the contents and names of service A to service n that can be distributed by the service distribution device 100 along with the vehicle travel conditions for use of those services. Further, as shown in, for example, FIG. 12(*b*) similar to FIGS. 4 to 8 above, the contents and names of the service A to service n that can be distributed by the service distribution device 100 may be displayed on the display unit 250 along with an image in a display format that accommodates information such as Stopped, Travelling speed: 10 km/h or less, and no travel restrictions imposed as the vehicle travel conditions for use of each type of services. In this case, the information terminal 200 can permit the user of the information terminal 200 to recognize the vehicle travel conditions for use of each type of services before the user acquires the services. This enables the user to acquire and utilize a service taking into account the vehicle travel conditions for use of the service, thereby further improving the convenience as the service distribution device and the service display device.

Figure 13:
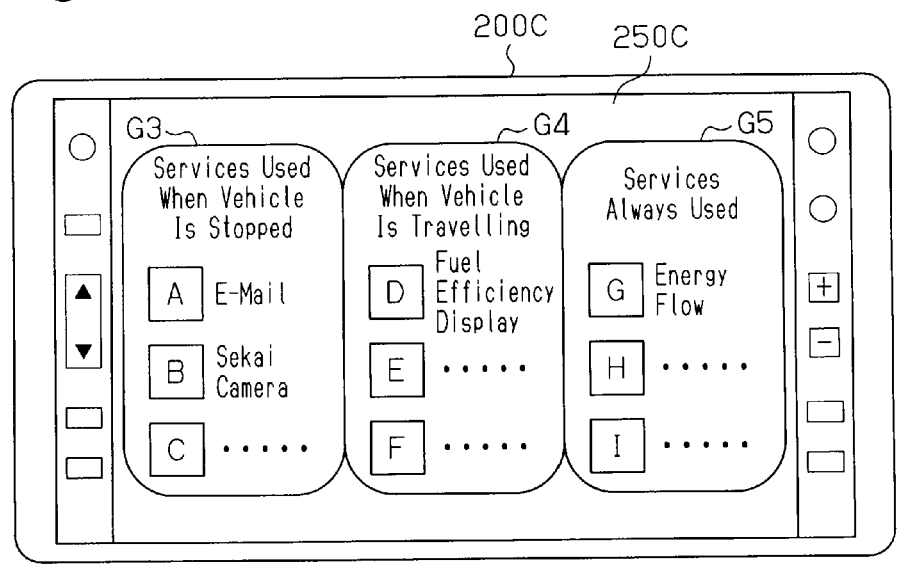
FIG. 13 is a diagram showing an example of the format for displaying the image information displayed on the display unit of the service distribution device and the service display unit according to a still further embodiment of the present invention.

In the above embodiments, service utilization conditions in relation to the vehicle travel condition are set on the relevant service so that information denoting the service utilization conditions would be employed as the information to be provided by the display unit 250 to the user of the information terminal 200. The present invention is not limited to thereto, that is, irrespective of whether the service utilization conditions are set, it is also possible by means of the image information generation unit 120 (also the terminal image information generation unit 280 and 280B depending on a situation) to generate image information denoting the utilization environment of a service expected in accordance with its purpose as the image information to be displayed on the display unit 250C in an information terminal 200C as shown in FIG. 13 similar to FIG. 4 above. In this case, when having received such image information generated by the image information generation unit 120 from the service distribution device 100 or the like, the display unit 250C provides image display of this image information on the display unit 250. As a result, as exemplified in FIG. 13, the display unit 250C displays services A to C, which are expected to be used when the vehicle is stopped as a group G3 in view of the characteristics of the services, also displays services D to F of which use is suited when the vehicle is travelling as another group G4 in view of the characteristics of the services. Similarly, the display unit 250C displays services G to I, which are expected to be always used irrespective of the vehicle travel condition (that is, services corresponding to a utilization environment common to a case where the vehicle is travelling and a case where it is stopped) as a further another group G5 in view of the characteristics of the services. Therefore, the user of the information terminal 200C can recognize a purpose and an expected utilization environment of each service before the user acquires the service from the service distribution device 100 based on group-specific display provided by the display unit 250C in accordance with the service utilization environment. In this case, the information correlation unit 110 correlates the plurality of types of services registered in the database 150 with the information pieces denoting the utilization environments of those services respectively and also registers the correlated information and the information about the contents of the relevant services in the table 111. Similarly, the identification unit 290 correlates the plurality of types of services that can be used in the information terminal 250C with the information pieces denoting the utilization environments of those services respectively and also registers the correlated information and the information about the contents of the relevant services in the terminal table 291.

Figure 14:
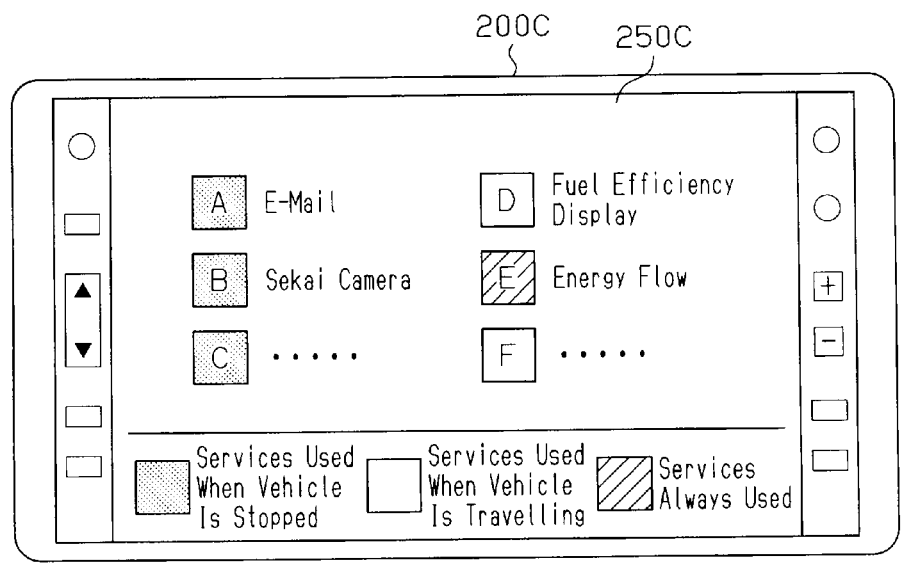
FIG. 14 is a diagram showing an example of the format for displaying the image information displayed on the display unit of the service distribution device and the service display unit according to an additional embodiment of the present invention.

Further, as shown in, for example, FIG. 14 similar to FIG. 5 above, the image information generation unit 120 can also generate image information in a display format showing services having the different utilization environments in different colors as the image information that is displayed on the display unit 250C in the information terminal 200C. In this case, the user of the information terminal 200C can recognize a purpose and an expected utilization environment of each service through the color-coded display by the display unit 250C in accordance with the service utilization environment before the user acquires the service from the service distribution device 100.

Figure 15:
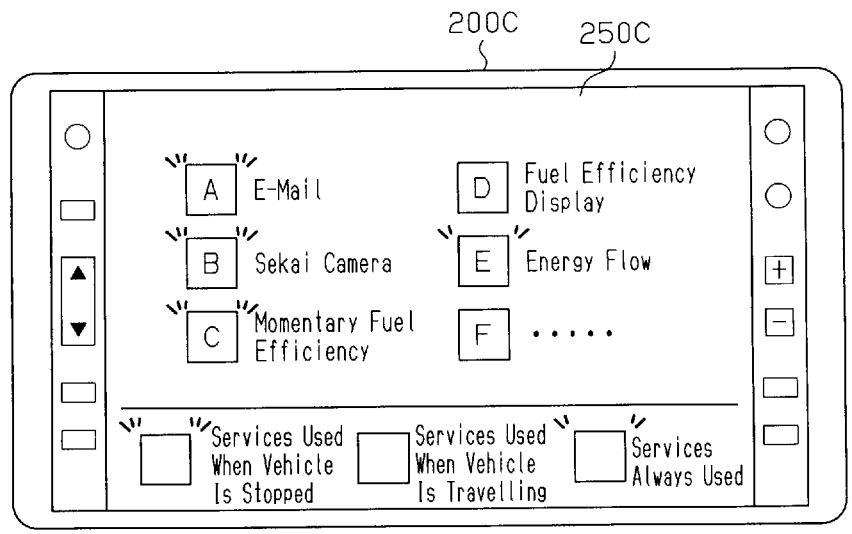
FIG. 15 is a diagram showing an example of the format for displaying the image information displayed on the display unit of the service distribution device and the service display unit according to an additional embodiment of the present invention.

Similarly, as shown in, for example, FIG. 15 similar to FIG. 7 above, the image information generation unit 120 can also generate image information in a display format capable of selecting services having the different utilization environments in constantly lit representation and blinking representation respectively as the image information that is displayed on the display unit 250C in the information terminal 200C. The display unit 250C displays, for example, services A to C, which are expected to be used when the vehicle is stopped in blinking representation at a short blinking interval of 0.1 second for that they may be noticeable in consideration of the characteristics of the services and also displays services D and F of which use is suited when the vehicle is travelling in constantly lit representation in consideration of the characteristics of the services. Further, the display unit 250C displays service E, which is expected to be always used irrespective of the vehicle travel condition in blinking representation at a different blinking interval of 0.5 second in consideration of the characteristics of the services. In this case, the user of the information terminal 200C can recognize a purpose and an expected utilization environment of each service through the service-specific lighting mode by the display unit 250C in accordance with the service use environment before the user acquires the service from the service distribution device 100.

Figure 16:
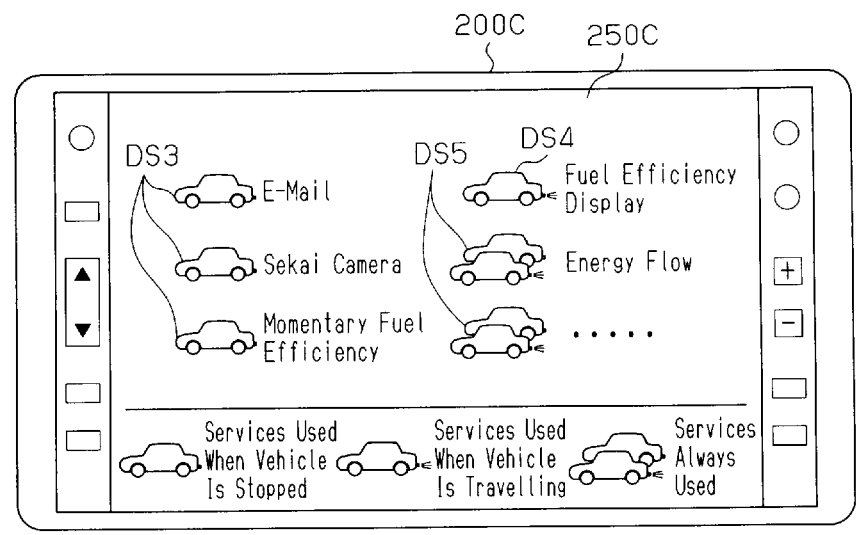
FIG. 16 is a diagram showing an example of the format for displaying the image information displayed on the display unit of the service distribution device and the service display unit according to an additional embodiment of the present invention.
Figure 17:
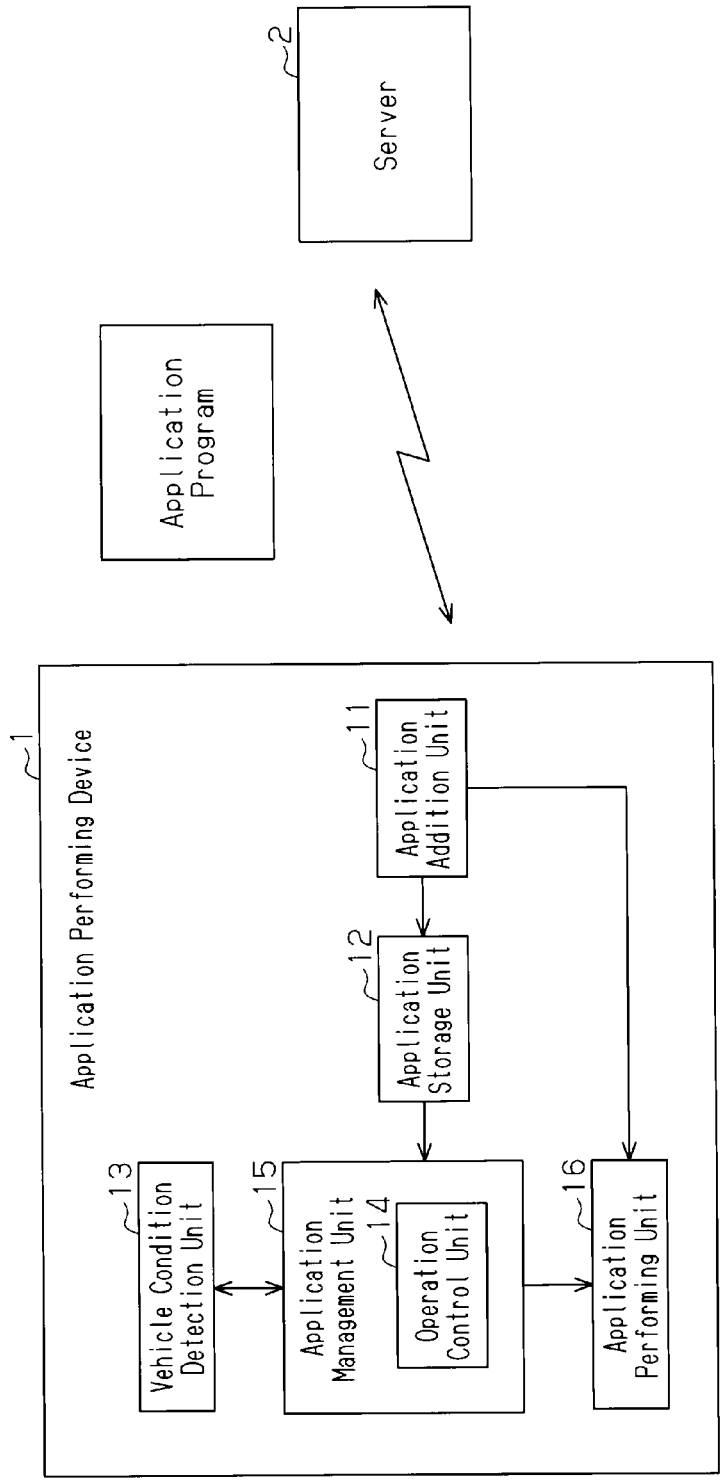
FIG. 17 is a block diagram showing an outlined configuration of a conventional information terminal (application performing device).

Further, similarly, as shown in, for example, FIG. 16 similar to FIG. 8 above, the image information generation unit 120 can also generate image information in a display format in which the different identifiers DS3 to DS5 are added to services having the different utilization environments as the image information that is displayed on the display unit 250C in the information terminal 200C. For example, the identifier DS3 denotes the mark of the vehicle that emits no exhaust gas, the identifier DS4 denotes the mark of the vehicle that emits exhaust gas, and the identifier DS5 denotes the mark of the vehicle that emits no exhaust gas and the mark of the vehicle that emits exhaust gas in condition where these marks are overlapped partially. In this case, the user of the information terminal 200C can recognize a purpose and an expected utilization environment of each service based on the respective identifiers DS3 to DS5, which are provided on the display unit 250C before the user acquires the service from the service distribution device 100.

The information denoting the utilization environments of services displayed on the display unit 250C may be the information of one or two of the service (identifier DS3) that is expected to be used when the vehicle is stopped, the service (identifier DS4) of which use is suited when the vehicle is travelling, and the service (identifier DS5) that is expected to be always used. Further, the display format of the image information provided on the display unit 250C is not limited to those shown in FIGS. 13 to 16 and can be given by appropriately combining those shown in FIGS. 13 to 16.

The utilization environments of the services of which information is displayed on the display unit 250C need not necessarily be subdivided into the information of the services that are expected to be used when the vehicle is stopped, that of the services of which use is suited when the vehicle is travelling, and that of the services that are expected to be always used, and may be subdivided more finely, for example, into that in which the vehicle is travelling on an express highway, that in which it is travelling in the suburbs, and that in which the weather is fine or bad. In short, the information denoting the utilization environments of the services displayed on the display unit 250C only needs to reflect the travel condition of the vehicle and the environments outside the vehicle that vary with the travel condition of the vehicle.

In the above first and second embodiments, the service distribution device 100 is configured to include the information correlation unit 110 for correlating various types of services with their utilization conditions and utilization environments. The present invention is not limited to thereto; for example, such a configuration as to omit the information correlation unit 110 from the service distribution device 100 may be employed in a case where a manager (person) or the like for managing the service distribution device 100 correlates the various types of services with information denoting their utilization conditions and utilization environments or a case where the various types of services are correlated with the information denoting their utilization conditions and utilization environments beforehand.

In the above embodiments, the service distribution device 100 is a management center to provide services by permitting the management center to distribute the services to the information terminal. However, the service distribution device need not always be the management center and may record a program for performing services in a storage medium such as a DVD-R, CD-R, or flash memory so that the information terminal may acquire the various types of services from the storage medium. In this case, also, the user of the information terminal can recognize beforehand the availability of the services stored in the storage medium and selectively acquire them from the storage medium.

In the above embodiments, a vehicle-use information terminal such as a vehicle-mounted navigation system has been employed as the information terminal. The present invention is not limited to thereto; the information terminal that is used for services may be a cell phone, smartphone, or the like that is used in the vehicle. In this case, for example, the information terminal acquires information such as a latitude/longitude and a car speed of the vehicle and determines the vehicle travel condition based on the acquired information to impose service restrictions. Further, in a case where the information terminal itself such as a smartphone includes a GPS or a vibration detection sensor, or the like, the information terminal can determine the vehicle travel condition based on a result of the detection by the sensor of the information terminal itself without acquiring the travel condition information from the vehicle. Further, services used in such an information terminal need not necessarily be vehicle-use contents or vehicle-use applications and only needs to be services of which utilization conditions vary with the vehicle travel condition.

100, 100A, 100B: Service Distribution Device
110: Information Correlation Unit
111: Table
120: Image Information Generation Unit
130: Device Reception Unit
140: Device Transmission Unit
150: Database
160: Service Extraction Unit
200, 200A, 200B, 200C: Information Terminal
210: Operation Unit
220: Terminal Transmission Unit
230: Terminal Reception Unit
240: Service Storage Region
250, 250c: Display Unit
260: Service Performing Unit
270: Travel Condition Detection Unit
280, 280B: Terminal Image Information Generation Unit
290: Determination Unit
291: Terminal Table
DS1 to DS5: Identifier

The invention claimed is:

1. A service distribution device for distributing services to be used in an information terminal to the information terminal, wherein the information terminal is mounted in a vehicle or used in the passenger compartment of a vehicle, the device comprising:
    a service distribution unit, wherein, prior the distribution of services, the service distribution unit is configured to distribute information that denotes service utilization conditions or a service utilization environment in relation to a travel condition of the vehicle, along with contents of a relevant service, to the information terminal so that the information and the contents can be visibly displayed on the information terminal; and
    an image information generation unit configured to generate image information, which can be visibly displayed on the information terminal, wherein
    when the services are a plurality of types of services, the image information generation unit is configured to generate contents of the plurality of types of services as image information in a display format capable of displaying the contents of the plurality of types of services simultaneously and to generate icons indicating a service can be used in accordance with the travel condition of the vehicle and a service cannot be used in accordance with the travel condition of the vehicle, and icons indicating a service of which use is suited for the travel condition of the vehicle and a service of which use is not suitable for the travel condition of the vehicle as the image information in the respective display formats permitting a user to recognize in advance whether a service can be used prior to distributing the service.

2. The service distribution device according to claim 1, wherein
    the information denoting the service utilization conditions in relation to the vehicle travel condition denotes whether the service can be used in accordance with the vehicle travel condition, and
    the information denoting the service utilization environment in relation to the vehicle travel condition is information denoting at least one of a utilization environment at the time when the vehicle is traveling as the service utilization environment that is expected in correspondence to a purpose of the service, a utilization environment at the time when the vehicle is stopped, and a utilization environment common to the time when the vehicle is traveling and the time when the vehicle is stopped.

3. The service distribution device according to claim 1, further comprising an information correlation unit configured to correlate, with the service, the information that denotes the service utilization conditions or the service utilization environment in relation to the travel condition of the vehicle.

4. The service distribution device according to claim 3, further comprising a database in which a plurality of types of services are registered beforehand, wherein
    the information correlation unit is configured to correlate the information that denotes the service utilization conditions or the service utilization environment in relation to the travel condition of the vehicle for each of the services registered in the database, and
    the service distribution unit is configured to extract the service of which distribution is requested by the information terminal as well as the information denoting the service utilization conditions or the service utilization environment correlated with the service from the database and distribute contents of the extracted service and the information denoting the service utilization conditions or the service utilization environment to the information terminal so that the contents and the information can be displayed visibly on the terminal.

5. The service distribution device according to claim 1, wherein
the service is a vehicle-use content or a vehicle-use application, and
the information terminal is a vehicle-use information terminal, which is used for operation of the vehicle-use content or the vehicle-use application.

6. The service distribution device according to claim 1, wherein, in respective display formats for the contents of the services having different service utilization conditions or service utilization environments, the contents of those services are displayed by subdividing the contents into groups corresponding to different service utilization conditions or different service utilization environments.

7. The service distribution device according to claim 1 wherein, in respective display formats for the contents of the services having different service utilization conditions or service utilization environments, the contents of those services are displayed in respectively different colors.

8. The service distribution device according to claim 1, wherein the image information generation unit is configured to generate the image information denoting services of which use is temporarily restricted from among the contents in blinking representation.

9. The service distribution device according to claim 1, wherein respective display formats for the contents of the services having different service utilization conditions or service utilization environments are configured to display the contents in constantly lit representation or blinking representation.

10. The service distribution device according to claim 1, wherein
the information denoting the service utilization conditions of the services in relation to the travel condition of the vehicle includes travel conditions of the vehicle for using the services, and
the image information unit is configured to visibly display the travel conditions of the vehicle for using the services.

11. The service distribution device according to claim 1, wherein the image information generation unit is configured to generate icons indicating that the services are subject to the travel restrictions and icons indicating that the services are not subject to the travel restrictions.

12. The service distribution device according to claim 1, wherein the image information generation unit is configured to generate icons indicating that utilization use of the service is permitted irrespective of the travel condition of the vehicle, icons indicating that the utilization use of the service is uniformly restricted when the vehicle is travelling, and icons indicating that the utilization use of the service is temporarily restricted when the vehicle is travelling at a given constant speed or greater.

13. The service distribution device according to claim 1, wherein the image information generation unit is configured to generate icons indicating that the service is suited for utilization use when the vehicle is travelling, icons indicating that the service is suited for utilization use when the vehicle is stopped, and icons indicating that the service is suited for full-time utilization use both when the vehicle is travelling and when the vehicle is stopped.

14. A service display device capable of displaying contents of services to be used in an information terminal, which is mounted in a vehicle or used in the passenger compartment of a vehicle, the device comprising a display unit for displaying, based on information denoting contents and utilization conditions or a utilization environment of the services distributed from a service distribution device, the information denoting the utilization conditions or the utilization environment of the relevant service along with the contents of this service, wherein
the service distribution device distributes information that denotes service utilization conditions or the utilization requirement in relation to a travel condition of the vehicle, along with contents of a relevant service, to the information terminal prior to the distribution of services so that the information and the contents can be visibly displayed on the information terminal,
the display unit is configured to simultaneously display a plurality of types of the services prior to the distribution of the services, and
when displaying the content of those services simultaneously, the display unit is configured to display icons indicating a service can be used in accordance with the travel condition of the vehicle and a service cannot be used in accordance with the travel condition of the vehicle, and icons indicating a service of which use is suited for the travel condition of the vehicle and a service of which use is not suitable for the travel condition of the vehicle as image information in respective display modes permitting a user to recognize in advance whether a service can be used prior to distributing the service.

15. The service display device according to claim 14, wherein, in a display in respective display modes by the display unit for the contents of the services having different utilization conditions or utilization environments, the different utilization conditions or utilization environments are subdivided into respectively different groups and displayed.

16. The service display device according to claim 14, wherein, in a display in respective display modes by the display unit for the contents of the services having different utilization conditions or utilization environments, the contents of those services are displayed in respectively different colors.

17. The service display device according to claim 14, wherein
the services includes a service of which use is temporarily restricted when the vehicle is in specific condition, and
the display unit is configured to display the contents of the services of which use is temporarily restricted in blinking representation.

18. The service display device according to claim 14, wherein a display in respective display modes by the display unit for the contents of the services having different utilization conditions or utilization environments is a determination display, in which constant lit representation or blinking representation is selected and employed.

19. The service display device according to claim 14, wherein
the information denoting the utilization conditions in relation to the travel condition of the vehicle includes travel conditions of the vehicle for using the services, and
the display unit is configured to display the travel conditions of the vehicle for using the services.

20. The service display device according to claim 14, wherein the display unit is mounted in the information terminal, which is mounted in the vehicle.

21. A service display device capable of displaying contents of services to be used in an information terminal, which is mounted in a vehicle or used in the passenger compartment of a vehicle,
  the device comprising a determination unit configured to determine service utilization conditions or service utilization environments in relation to travel condition of the vehicle; and
  a display unit configured to display information denoting the service utilization conditions or the service utilization environment determined by the determination unit along with contents of a relevant service, wherein
  the display unit is configured to simultaneously display a plurality of types of the services prior to the distribution of the services, and
  when displaying the content of those services simultaneously, the display unit is configured to display icons indicating a service can be used in accordance with the travel condition of the vehicle and a service cannot be used in accordance with the travel condition of the vehicle, and icons indicating a service of which use is suited for the travel condition of the vehicle and a service of which use is not suitable for the travel condition of the vehicle as image information in respective display modes permitting a user to recognize in advance whether a service can be used prior to distributing the service.

22. The service display device according to claim 21, further comprising a table in which the service utilization conditions or the service utilization environment for the travel condition of the vehicle are registered,
  wherein the determination unit is configured to determine the service utilization conditions or the service utilization environments by referencing the table.

23. The service display device according to claim 21, wherein
  the information denoting the service utilization conditions for the travel condition of the vehicle denotes whether the services can be used in relation to the travel condition of the vehicle, and
  the information denoting the service utilization environment in relation to the travel condition of the vehicle is information denoting at least one of a utilization environment at the time when the vehicle is traveling as the service utilization environment of the service that is expected in correspondence to a purpose of the service, a utilization environment at the time when the vehicle is stopped, and a utilization environments common to the time when the vehicle is traveling and the time when the vehicle is stopped.

24. The service display device according to claim 21, wherein, in a display in respective display modes by the display unit for the contents of the services having different service utilization conditions or service utilization environments, the different service utilization conditions or service utilization environments are subdivided into respectively different groups and displayed.

25. The service display device according to claim 21, wherein, in a display in respective display modes by the display unit for the contents of the services having different service utilization conditions or service utilization environments, the contents of those services are displayed in respectively different colors.

26. The service display device according to claim 21, wherein
  the determination unit is configured to determine the service of which use is temporarily restricted when the vehicle is in specific condition from the information denoting the service utilization conditions in relation to the travel condition of the vehicle, and
  the display unit is configured to display the contents of the service of which use is temporarily restricted in blinking representation.

27. The service display device according to claim 21, wherein a display in respective display modes by the display unit for the contents of the services having the different service utilization conditions or service utilization environments is a determination display in which constantly lit representation or blinking representation is selected and implemented.

28. The service display device according to claim 21, wherein
  the determination unit is configured to determine travel conditions of the vehicle for using the service as the information denoting the service utilization conditions in relation to the travel condition of the vehicle, and
  the display unit is configured to display the vehicle travel conditions determined by the determination unit for using the services.

29. The service display device according to claim 21, wherein the display unit is mounted in the information terminal mounted in the vehicle.

* * * * *